(12) United States Patent
Ji et al.

(10) Patent No.: US 9,806,780 B2
(45) Date of Patent: Oct. 31, 2017

(54) METHOD AND APPARATUS FOR GENERATING AND TRANSMITTING CHANNEL FEEDBACK IN MOBILE COMMUNICATION SYSTEM EMPLOYING TWO DIMENSIONAL ANTENNA ARRAY

(71) Applicant: Samsung Electronics Co., Ltd., Gyeonggi-do (KR)

(72) Inventors: Hyoungju Ji, Seoul (KR); Younsun Kim, Gyeonggi-do (KR); Juho Lee, Gyeonggi-do (KR); Hyojin Lee, Gyeonggi-do (KR); Youngwoo Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/720,239

(22) Filed: May 22, 2015

(65) Prior Publication Data

US 2015/0341093 A1 Nov. 26, 2015

(30) Foreign Application Priority Data

May 22, 2014 (KR) ........................ 10-2014-0061906

(51) Int. Cl.
*H04B 7/04* (2017.01)
*H04B 7/06* (2006.01)
(Continued)

(52) U.S. Cl.
CPC .......... *H04B 7/0478* (2013.01); *H04B 1/707* (2013.01); *H04B 7/0617* (2013.01); *H04B 7/0626* (2013.01); *H04J 11/00* (2013.01)

(58) Field of Classification Search
CPC ... H04L 5/0048; H04L 5/0053; H04L 5/0094; H04L 5/0057; H04W 24/08; H04W 72/0413; H04W 72/042
(Continued)

(56) References Cited

U.S. PATENT DOCUMENTS 8,526,519 B2 * 9/2013 Chen ................ H04L 25/03343
375/260
8,971,434 B2 * 3/2015 Frenne ................ H04B 7/0417
375/219
(Continued)

FOREIGN PATENT DOCUMENTS

EP      2 645 616        10/2013
WO   WO 2013/081368     6/2013

OTHER PUBLICATIONS

International Search Report dated Sep. 7, 2015 issued in counterpart application No. PCT/KR2015/005109, 4 pages.

*Primary Examiner* — Helene Tayong
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Provided are a method and user equipment for sending feedback information to a base station. The method includes receiving a Channel Status Indication Reference Signal (CSI-RS) from the base station; generating feedback information on a basis of the received CSI-RS; and transmitting the generated feedback information to the base station, wherein generating feedback information includes selecting a precoding matrix for each antenna port group of the base station and selecting an additional precoding matrix on a basis of a relationship between the antenna port groups of the base station.

18 Claims, 12 Drawing Sheets

(51) Int. Cl.
*H04J 11/00* (2006.01)
*H04B 1/707* (2011.01)

(58) Field of Classification Search
USPC .......................................................... 375/267
See application file for complete search history.

(56) References Cited

U.S. PATENT DOCUMENTS

| | | | |
|---|---|---|---|
| 2010/0232525 A1* | 9/2010 | Xia | H04B 7/0626 |
| | | | 375/259 |
| 2011/0170622 A1 | 7/2011 | Nakayama | |
| 2012/0287875 A1* | 11/2012 | Kim et al. | 370/329 |
| 2013/0258964 A1 | 10/2013 | Nam et al. | |
| 2013/0329664 A1 | 12/2013 | Kim et al. | |
| 2014/0003240 A1* | 1/2014 | Chen | H04W 28/08 |
| | | | 370/235 |
| 2014/0044044 A1 | 2/2014 | Josiam et al. | |
| 2014/0079149 A1 | 3/2014 | Lee et al. | |
| 2014/0098689 A1* | 4/2014 | Lee et al. | 370/252 |
| 2014/0153515 A1* | 6/2014 | Chun et al. | 370/329 |

* cited by examiner

METHOD AND APPARATUS FOR GENERATING AND TRANSMITTING CHANNEL FEEDBACK IN MOBILE COMMUNICATION SYSTEM EMPLOYING TWO DIMENSIONAL ANTENNA ARRAY

PRIORITY

This application claims priority under 35 U.S.C. §119(a) to a Korean Patent Application filed on May 22, 2014 in the Korean Intellectual Property Office and assigned Serial No. 10-2014-0061908, the entire content of which is incorporated herein by reference.

BACKGROUND

1. Field of the Invention

The present invention relates generally to a wireless mobile or system, and more particularly, to a method of transmitting and receiving channel state information wherein a user equipment measures radio channel quality and reports the measurement result to a base station in a wireless mobile communication system employing a multi-carrier multiple access scheme such as Orthogonal Frequency Division Multiple Access (OFDMA), and to a system in which a base station transmits to, and receives from, user equipments using multiple antennas.

2. Description of the Related Art

To meet the demand for wireless data traffic which has increased since the deployment of 4G communication systems, efforts have been made to develop an improved 5G or pre-5G communication system. Therefore, a 5G or pre-5G communication system is also called a "Beyond 4G Network" or a "Post LTE System." A 5G communication system is considered to be implemented in higher frequency (e.g. mmWave) bands, e.g., 60 GHz bands, so as to accomplish higher data rates. To decrease propagation loss of the radio waves and increase the transmission distance, beamforming, massive Multiple-Input Multiple-Output (MIMO), Full Dimensional MIMO (FD-MIMO), array antenna, analog beam forming, and are scale antenna techniques are discussed in 5G communication systems. In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like. In a 5G system, Hybrid Frequency Shift Keying (FSK) and Feher's Quadrature Amplitude Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

The Internet, which is a human centered connectivity network where humans generate and consume information, is now evolving to the Internet of Things (IoT), where distributed entities, such as things, exchange and process information without human intervention. The Internet of Everything (IoE), which is a combination of IoT technology and Big Data processing technology through connection with a cloud server, has emerged. As technology elements, such as "sensing technology," "wired/wireless communication and network infrastructure," "service interface technology," and "security technology" have been demanded for IoT implementation, a sensor network, Machine-to-Machine (M2M) communication, Machine Type Communication (MTC), and so forth have been recently researched, Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between 5G technology and IoT technology.

In contrast to early mobile communication systems providing voice-oriented services only, advanced mobile communication systems may provide high-quality data and multimedia services based on high-speed packet data communication. To this end, several standardization organizations including $3^{rd}$ Generation Partnership Project (3GPP), 3GPP2 and the Institute of Electrical and Electronics Engineers (IEEE) have been working to standardize enhanced $3^{rd}$ Generation (3G) mobile communication systems. In recent years, various mobile communication standards including 3GPP Long Term Evolution (LTE), 3GPP2 Ultra Mobile Broadband (UMB) and IEEE 802.16m have been developed to support high-speed and high-quality wireless packet data services based pan multi-carrier multiple access schemes.

Existing enhanced 3G mobile communication systems such as LIE, UMB, 802.16m are based on multi-carrier multiple access schemes and utilize various techniques for increasing transmission efficiency, such as Multiple Input Multiple Output (MIMO), beamforming, Adaptive Modulation and Coding (AMC), and channel sensitive scheduling. These techniques may enhance transmission efficiency and increase system throughput by concentrating transmit power or adjusting the amount of data to be sent through multiple antennas according to channel quality, or by transmitting data to users with acceptable channel quality in a selective manner.

In most cases, such techniques work on the basis of channel state information between a base station (e.g. evolved Node B (eNB)) and a user terminal (User Equipment (UE), or Mobile Station (MS)), Hence, an eNB or a UE must measure states of the channel between the eNB and the UE. A Channel State Information Reference Signal (CSI-RS) is used for this purpose. An eNB is an apparatus located at a specific site for downlink transmission and uplink reception, and may perform transmission and reception for multiple cells. In one mobile communication system, multiple eNBs are distributed at geographically separated sites and each eNB performs transmission and reception for two or more cells.

To increase data rates and system throughput, existing 3G and 4G mobile communication systems such as LTE/LTE Advanced (LTE-A) may utilize MIMO technologies based on multiple transmit and receive antennas. In MIMO, multiple spatially separated information streams may be sent by use of multiple transmit and receive antennas. Transmission of multiple spatially separated information streams is referred to as spatial multiplexing. The number of information streams that can be sent through spatial multiplexing varies according to the number of antennas at the transmitter and the receiver, in general, the number of information streams that can be sent through spatial multiplexing is referred to as the transmission rank. In LTE/LTE-A up to Release 11, MIMO spatial multiplexing with 8 transmit antennas and 8 receive antennas may support up to rank 8 transmission.

FIG. 1 illustrates a communication system to which the present invention is applied.

In FIG. 1, a base station transmitter 100 may utilize several dozen or more transmit antennas to send radio signals. As shown in FIG. 1, transmit antennas are uniformly placed with a fixed spacing. The fixed spacing may correspond to multiples of half the wavelength of a radio signal being sent. In general, when transmit antennas are separated by a distance corresponding to one half the wavelength of the radio signal, signals sent by the transmit antennas receive influence from low correlated radio channels. The correlation between signals becomes lower with increasing distance between the transmit antennas.

In FIG. 1, several dozen or more transmit antennas installed in the base station transmitter 100 are used to transmit signals 120 to one or more UEs. Suitable precoding is applied to the transmit antennas so that signals are simultaneously transmitted to multiple UEs. In this case, a UE may receive one or more information streams. In general, the number of information streams that one UE can receive is determined according to the number of receive antennas of the UE and channel conditions.

For effective MIMO implementation, it is required for UEs to accurately measure the channel condition and interference and effectively send corresponding channel state information to the eNB. Upon reception of the channel state information, the eNB may determine the UEs to receive downlink transmission, data rates to be used, and precoding modes to be applied on the basis of the channel state information. When the schemes for channel state information transmission and reception used in the existing LTE/LIE-A system are applied to Full-Dimension MIMO (FD-MIMO) involving a large number of transmit antennas, an uplink overhead problem, which requires transmission of a large amount of control information in the uplink, may arise.

Time, frequency and power resources are limited in a mobile communication system. As such, allocation of more resources to reference signals may cause reduction of resources allocable to data traffic channels. This may reduce the amount of data being actually transmitted. In other words, enhancement of channel measurement and estimation may cause reduction of the amount of data being actually transmitted, degrading overall system throughput.

Accordingly, it is necessary to maintain a balance between resource allocation for reference signals and resource allocation for traffic channels so as to produce optimum performance in terms of overall system throughput.

FIG. 2 illustrates a radio resource with one subframe and one resource block serving as a minimum unit for downlink scheduling in the LTE/LTE-A system.

As shown in FIG. 2, the radio resource is composed of one subframe in the time domain and one Resource Block (RB) in the frequency domain. The radio resource includes 12 subcarriers in the frequency domain and 14 Orthogonal Frequency Division Multiplexing (OFDM) symbols in the time domain, and hence is composed of 168 unique frequency-time positions in total. In LTE/LTE-A, each frequency-time position in FIG. 2 is referred to as a Resource Element (RE).

The radio resource shown in FIG. 2 may be used to transmit different types of signals as follows.

A Cell-specific Reference Signal (CRS) is a reference signal that is periodically transmitted for all UEs within a cell and may be commonly used by multiple UEs.

A Demodulation Reference Signal (DMRS) is a reference signal transmitted to a specific UE. The DMRS is sent only when data is sent to the corresponding UE. The DMRS may include 8 DMRS ports in total. In LTE/LTE-A, ports 7 to 14 correspond to DMRS ports, and orthogonality between these ports is preserved through Code Division Multiplexing (CDM) or Frequency Division Multiplexing (FDM) so as not to cause interference with each other.

A Physical Downlink Shared Channel (PDSCH) is a downlink data channel used by an eNB to transmit traffic data to a UE and is mapped to REs not used for reference signal transmission in the data region of FIG. 2.

A Channel Status Information Reference Signal (CSI-RS) is a reference signal transmitted to UEs within a cell and used for channel state measurement. Multiple CSI-RS may be sent within a cell.

Other control channels (e.g., Physical Hybrid-Automatic Repeat reQuest (ARQ) Indicator Channel (PHICH), Physical Control Format Indicator Channel (PCFICH), Physical Downlink Control Channel (PDCCH)) are channels for providing control information needed by a UE to receive a PDCCH or for transmitting an ACKnowledged/Not ACKnowledged (ACK/NACK) message for a Hybrid Automatic Repeat reQuest (HARQ) operation in relation to an uplink data transmission.

In addition to the above signals, in LTE-A, muting may be configured to permit UEs within a corresponding cell to receive CSI-RSs sent by a different eNB without Interference. Muting can be applied to positions designated for CSI-RS, and a UE may receive a traffic signal while skipping a radio resource with configured muting. In the LTE-A system, muting may be referred to as a zero-power CSI-RS. Muting in itself is applied to the CSI-RS position without transmit power distribution.

In FIG. 2, the CSI-RS may be transmitted using some of the positions marked by A, B, C, D, E, F, G, H, I and J according to the number of antennas for CSI-RS transmission. Muting may also be applied to some of the positions A, B, C, D, E, F, G, H, I and J. In particular, the CSI-RS can be sent via 2, 4 or 8 REs according to the number of antenna ports for transmission. For two antenna ports, one half of a certain pattern is used for CSI-RS transmission; for four antenna ports, the whole of a certain pattern is used for CSI-RS transmission; and for eight antenna ports, two patterns are used for CSI-RS transmission. In addition, muting is always applied on a pattern basis. That Is, although muting may be applied to plural patterns, it cannot be applied to a part of one pattern unless the muting position overlaps the CSI-RS position. Muting may be applied to a part of one pattern only when the muting position overlaps the CSI-RS position.

In the case of CSI-RS transmission for two antenna ports, signals of the two antenna ports are sent respectively via two REs consecutive in the time domain and are distinguished from each other through orthogonal codes. In the case of CSI-RS transmission for four antenna ports, signals of two antenna ports are sent in the same manner as in the above case for two antenna ports and signals of the two remaining antenna ports are sent in the same manner via two additional REs. The above procedure may be applied to the case of CSI-RS transmission for eight antenna ports.

In a cellular system, a base station must send a reference signal to the mobile station for measurement of downlink channel states. In a 3GPP LTE-A system, the UE measures the status of the channel between an eNB and a UE by use of the CSI-RS transmitted by the eNB. The channel state is measured in consideration of several factors including downlink interference. Such downlink interference may include the interference caused by antennas of neighbor eNBs and thermal noise, and is important for determining the downlink channel condition. For example, in the case where an eNB with one transmit antenna sends a reference signal to a UE with one receive antenna, the UE must determine the energy per symbol that can be received in the downlink on the basis of the reference signal received from the eNB and the amount of interference that may be received simultaneously for the duration of receiving the corresponding symbol and determine the Energy per symbol to Interference density ratio (Es/Io). The determined ratio Es/Io is converted into a data rate or corresponding value, which is then reported to the eNB as a Channel Quality Indicator (CQI). Hence, the eNB may determine the data rate for downlink transmission to the UE.

In the LTE-A system, the UE feeds back information on downlink channel states to the eNB, so that the eNB may utilize the feedback information for downlink scheduling. That is, the eNB measures a downlink reference signal sent by the eNB and feeds back information extracted from the measurement to the eNB according to a rule specified in the LTE/LTE-A standard. In LTE/LTE-A, three pieces of information are fed back by the UE in general as described below.

Rank Indicator (RI) is a number of spatial layers available to the UE in the current channel condition.

Precoder Matrix Indicator (PMI) is an index to the precoding matrix preferred by the UE in the current channel condition.

Channel Quality Indicator (CQI) is a maximum data rate available to the UE in the current channel condition. The CQI may be replaced with a parameter similar to the maximum data rate, such as Signal to Interference plus Noise Ratio (SINR), maximum error correction coding rate associated with a modulation scheme, or data rate per frequency.

The RI, PMI and CQI are associated with each other in meaning. For example, the precoding matrixes supported in LTE/LTE-A are defined differently for different ranks. Hence, the interpretation of the same PMI value when the RI is set to 1 is different from that when the RI is set to 2. In addition, when determining the CQI, the UE assumes that the PMI and RI reported to the eNB are applied at the eNB. For example, if the UE has reported RI_X, PMI_Y and CQI_Z to the eNB, this means that the UE is capable of receiving data at a data rate corresponding to CQI_Z on the assumption of rank RI_X and precoding PMI_Y. In this way, the UE may assume a transmission scheme to be used by the eNB and calculate the CQI so that optimal performance can be obtained when actual transmission is performed using the assumed transmission scheme.

In LTE/LTE-A, periodic feedback of the UE may be configured as one of the following four feedback modes (or reporting modes) according to the information to be included therein:

reporting mode 1-0 reports RI and wideband CQI (wCQI);

reporting mode 1-1 reports RI, wCQI, and PMI;

reporting mode 2-0 reports RI, wCQI, and subband CQI (sCQI); and reporting mode 2-1 reporting RI, wCQI, sCQI, and PMI.

The feedback timing in each feedback mode is determined based on the values transmitted through higher layer signaling such as $N_{pd}$, $N_{OFFSET,CQI}$, $M_{RI}$ and $N_{OFFSET,RI}$. In feedback mode 1-0, the wCQI transmission period is $N_{pd}$, and the feedback timing is determined based on the subframe offset value of $N_{OFFSET,CQI}$. The RI transmission period is $N_{pd} \cdot M_{RI}$, and the offset is $N_{OFFSET,CQI} + N_{OFFSET,RI}$.

FIG. 3 illustrates feedback timing of RI and wCQI when $N_{pd}=2$, $M_{RI}=2$, $N_{OFFSET,CQI}=1$ and $N_{OFFSET,RI}=-1$. In FIG. 3, each timing (0-20) is indicated by a subframe Index.

In this case, feedback mode 1-1 has the same timing as feedback mode 1-0 with the exception that the PMI is transmitted together with the wCQI at the wCQI transmission timing.

In feedback mode 2-0, the sCQI feedback period is $N_{pd}$ and the offset is $N_{OFFSET,CQI}$. The wCQI feedback period is $H \cdot N_{pd}$ and the offset is $N_{OFFSET,CQI}$ as in the case of the sCQI offset. Here, $H=J \cdot K+1$ where K is a value transmitted via higher layer signaling and J is a value determined based on the system bandwidth. For example, J is set to 3 in the 10 MHz system. This means that the wCQI is transmitted once at every H sCQI transmissions as a replacement of the sCQI. The RI period is $M_{RI} \cdot H \cdot N_{pd}$ and the offset is $N_{OFFSET,CQI} + N_{OFFSET,RI}$.

FIG. 4 illustrates feedback timing of the RI, sCQI and wCQI when $N_{pd}=2$, $M_{RI}=2$, $J=3$ (10 MHz), $K=1$, $N_{OFFSET,CQI}=1$, and $N_{OFFSET,RI}=-1$. Feedback mode 2-1 has the same timing as feedback mode 2-0 with the exception that the PMI is transmitted together with the wCQI at the wCQI transmission timing.

Unlike the above feedback timing applied to the case of up to 4 CSI-RS antenna ports, for a UE associated with 8 CSI-RS antenna ports, two PMIs must be fed back. In the case of 8 CSI-RS antenna ports, feedback mode 1-1 is divided into two submodes. In a first sub-mode, the first PMI is transmitted together with the RI and the second PMI is transmitted together with the wCQI. In this case, the feedback period for the wCQI and second PMI is set to $N_p$ and the offset is set to $N_{OFFSET,CQI}$, and the feedback period for the RI and first PMI is set to $M_{RI} \cdot N_{pd}$ and the offset is set to $N_{OFFSET,CQI} + N_{OFFSET,RI}$. In this case, if the precoding matrix corresponding to the first PMI is $W_1$ and the precoding matrix corresponding to the second PMI is $W_2$, the UE and the eNB share the information indicating that the precoding matrix preferred by the UE is determined as $W_1 W_2$.

For 8 CSI-RS antenna ports, feedback mode 2-1 employs a Precoding Type Indicator (PTI) as new information. The PTI is transmitted together with the RI at a period of $M_{RI} \cdot H \cdot N_{pd}$ with an offset of $N_{OFFSET,CQI} + N_{OFFSET,RI}$.

Specifically, for PTI=0, all of the first PMI, the second PMI and the wCQI are transmitted. In this case, the wCQI and the second PMI are sent together at the same time at a period of $N_{pd}$ with an offset of $N_{OFFSET,CQI}$. The first PMI is transmitted at a period of $H' \cdot N_{pd}$ with an offset of $N_{OFFSET,CQI}$. In this case, H' is transmitted via higher layer signaling.

For PTI=1, the PTI and RI are transmitted together. In this case, the wCQI and the second PMI are transmitted together, and the sCQI is transmitted at a separate time. In this case, the first PMI is not transmitted. The PTI and RI are transmitted at the same period with the same offset as the case of PTI=0. The sCQI is transmitted at a period of $N_{pd}$ with an offset of $N_{OFFSET,CQI}$. The wCQI and the second PMI are transmitted at a period of $H \cdot N_{pd}$ with an offset of $N_{OFFSET,CQI}$, and H is set to the same value as the case of 4 CSI-RS antenna ports.

FIGS. 5 and 6 illustrate feedback timings respectively for PTI=0 and PTI=1 when $N_{pd}$=2, $M_{RI}$=2, J=3 (10 MHz), K=1, H'=3, $N_{OFFSET,CQI}$=1 and $N_{OFFSET,RI}$=−1.

In general, for FD-MIMO employing a large number of transmit antennas, the number of CSI-RS transmissions should increase in proportion to the number of transmit antennas. For example, in LTE/LTE-A, when 8 transmit antennas are used, the eNB must transmit CSI-RSs corresponding to eight ports to the UE for downlink channel state measurement. In this case, to transmit CSI-RSs corresponding to eight ports, a radio resource having 8 REs in one RB must be allocated for CSI-RS transmission as indicated by the positions marked by A and B in FIG. 2. When the CSI-RS transmission scheme of LTE/LTE-A is applied to FD-MIMO, a radio resource must be allocated in proportion to the number of transmit antennas for CSI-RS transmission. That is, an eNB having 64 transmit antennas must transmit CSI-RSs by use of 64 REs. Such a CSI-RS transmission scheme generating feedback information for each CSI-RS consumes excessive feedback resources. Hence, there is a need for a scheme that uses fewer feedback resources.

SUMMARY

The present invention has been made to address at least the above-mentioned problems and/or disadvantages and to provide at least the advantages described below.

Accordingly, an aspect of the present invention Is to provide a method and apparatus that enable a user equipment to measure reference signals, generate channel state information, and transmit the channel state Information so as to achieve effective data transmission and reception in an LTE-A system employing FD-MIMO.

Another aspect of the present invention is to provide a method and apparatus that enable a base station to send reference signals to a user equipment and receive channel state information from the user equipment in an effective manner.

In accordance with an aspect of the present invention, a method of a user equipment to send feedback information to a base station is provided. The method includes receiving a Channel Status Indication Reference Signal (CSI-RS) from the base station; generating feedback information on a basis of the received CSI-RS; and transmitting the generated feedback information to the base station, wherein generating feedback information comprises selecting a precoding matrix for each antenna port group of the base station and selecting an additional precoding matrix on a basis of a relationship between the antenna port groups of the base station.

In accordance with another aspect of the present Invention, a method of a user equipment to send feedback Information to a base station is provided. The method includes receiving a Channel Status Indication Reference Signal (CSI-RS) from the base station; generating feedback information on a basis of the received CSI-RS; and transmitting the generated feedback information to the base station, wherein generating feedback information comprises selecting a precoding matrix for all antenna port groups of the base station and selecting an additional precoding matrix on a basis of a relationship between the antenna port groups of the base station.

In accordance with another aspect of the present invention, a method of a user equipment to send feedback information to a base station is provided. The method includes receiving feedback configuration information from the base station; receiving a Channel Status Indication Reference Signal (CSI-RS) from the base station; generating feedback information on a basis of the received feedback configuration information and the CSI-RS; and transmitting the generated feedback information to the base station, wherein receiving feedback configuration Information comprises receiving feedback configuration information corresponding to antenna port groups of the base station and receiving additional feedback configuration information based on a relationship between the antenna port groups.

In accordance with another aspect of the present invention, a method of a user equipment to send feedback information to a base station is provided. The method includes transmitting first feedback information generated based on a first Channel Status Indication Reference Signal (CSI-RS) from the base station; receiving a second CSI-RS beamformed on a basis of the first feedback information from the base station; generating second feedback information on a basis of the received second CSI-RS; and transmitting the second feedback information to the base station.

In accordance with another aspect of the present invention, a method of a base station to receive feedback information from a user equipment is provided. The method includes transmitting feedback configuration information to the user equipment; transmitting a Channel Status indication Reference Signal (CSI-RS) to the user equipment; and receiving feedback information generated based on the feedback configuration Information and the CSI-RS from the user equipment, wherein transmitting feedback configuration information includes sending feedback configuration Information corresponding to antenna port groups of the base station and sending additional feedback configuration information based on a relationship between the antenna port groups.

In accordance with another aspect of the present invention, a method of a base station to receive feedback information from a user equipment is provided. The method includes receiving first feedback information from the user equipment; transmitting a Channel Status Indication Reference Signal (CSI-RS) beamformed on a basis of the first feedback information to the user; and receiving second feedback information generated based on the CSI-RS from the user equipment.

In accordance with another aspect of the present invention, a user equipment capable of sending feedback information to a base station is provided. The user equipment includes a communication unit configured to send and receive signals to and from the base station; and a control unit configured to perform a process of receiving a Channel Status Indication Reference Signal (CSI-RS) from the base station, generating feedback information on a basis of the received CSI-RS, and transmitting the generated feedback information to the base station.

In accordance with another aspect of the present invention, a user equipment capable of sending feedback information to a base station is provided. The user equipment includes a communication unit configured to send and receive signals to and from the base station; and a control unit configured to perform a process of receiving a Channel Status Indication Reference Signal (CSI-RS) from the base station, generating feedback information on a basis of the received CSI-RS, and transmitting the generated feedback information to the base station, wherein the control unit is further configured to select a precoding matrix for all antenna port groups of the base station and select an additional precoding matrix on the basis of a relationship between the antenna port groups of the base station.

In accordance with another aspect of the present invention, a user equipment capable of sending feedback information to a base station is provided. The user equipment includes a communication unit configured to send and receive signals to and from the base station; and a control unit configured to perform a process of receiving feedback configuration Information from the base station, receiving a Channel Status Indication Reference Signal (CSI-RS) from the base station, generating feedback information on a basis of the received feedback configuration information and CSI-RS, and transmitting the generated feedback information to the base station, wherein the control unit is further configured to receive feedback configuration information corresponding to antenna port groups of the base station and receive additional feedback configuration information based on a relationship between the antenna port groups.

In accordance with another aspect of the present invention, a user equipment capable of sending feedback information to a base station is provided. The user equipment includes a communication unit configured to send and receive signals to and from the base station; and a control unit configured to perform a process of transmitting first feedback information generated based on a first CSI-RS from the base station, receiving a second CSI-RS beamformed on a basis of the first feedback information from the base station, generating second feedback information on a basis of the received second CSI-RS, and transmitting the second feedback information to the base station.

In accordance with another aspect of the present Invention, a base station capable of receiving feedback information from a user equipment is provided. The base station includes a communication unit configured to send and receive signals to and from the user equipment; and a control unit configured to perform a process of transmitting feedback configuration information to the user equipment, transmitting a Channel Status Indication Reference Signal (CSI-RS) to the user equipment, and receiving feedback information generated based on the feedback configuration information and the CSI-RS from the user equipment, wherein the control unit is further configured to send feedback configuration information corresponding to antenna port groups of the base station and send additional feedback configuration information based on a relationship between the antenna port groups.

In accordance with another aspect of the present invention, a base station capable of receiving feedback information from a user equipment is provided. The base station includes a communication unit configured to send and receive signals to and from the user equipment; and a control unit configured to perform a process of receiving first feedback information from the user equipment, transmitting a Channel Status Indication reference Signal (CSI-RS) beamformed on a basis of the first feedback information to the user equipment, and receiving second feedback information generated based on the CSI-RS from the user equipment.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. Detailed descriptions of well-known functions and structures incorporated herein may be omitted to avoid obscuring the subject matter of the present invention. The terms and words used in the following description and claims are not limited to their dictionary meanings and should be construed in accordance with the scope and spirit of the present invention.

The description of embodiments of the present invention is focused on an OFDM-based radio communication system compliant with the 3GPP Evolved Universal Terrestrial Radio Access (EUTRA) standard in particular. However, it should be understood by those skilled in the art that the subject matter of the present invention or variations thereof is applicable to other communication systems having similar technical backgrounds and channel structures without significant modifications departing from the scope and spirit of the present invention.

Figure 1:
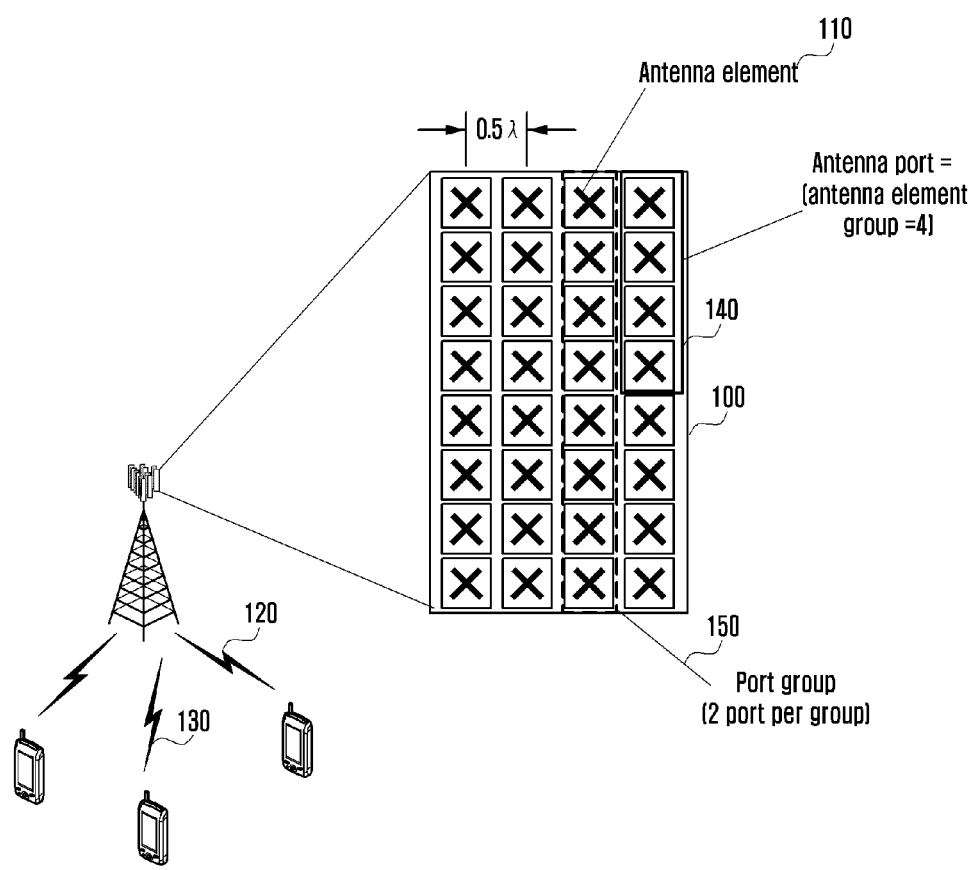
FIG. 1 illustrates a communication system to which the present invention is applied.
Figure 2:
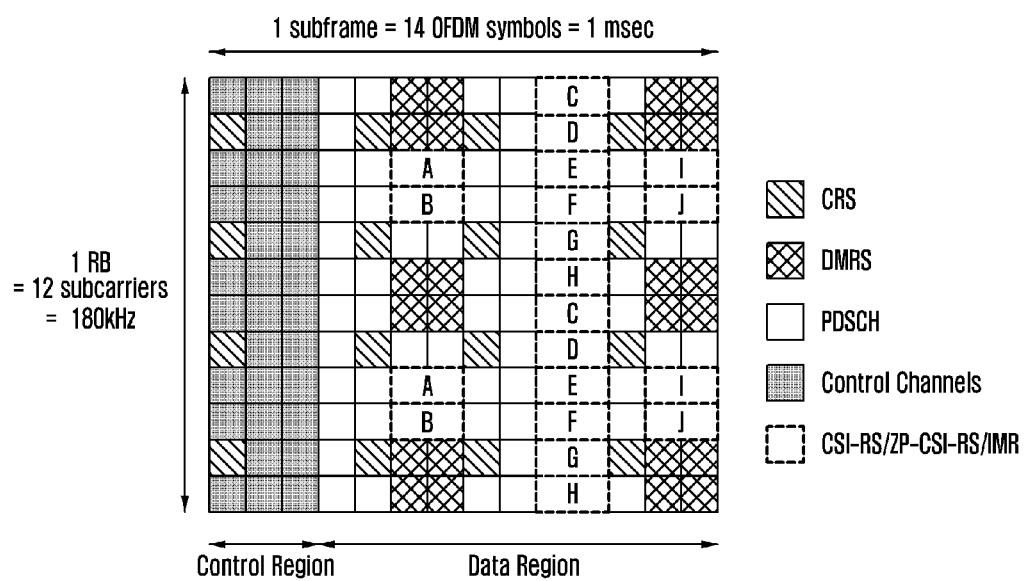
FIG. 2 illustrates a radio resource with one subframe and one RB serving as a minimum unit for downlink scheduling in an LTE/LTE-A system.
Figure 3:
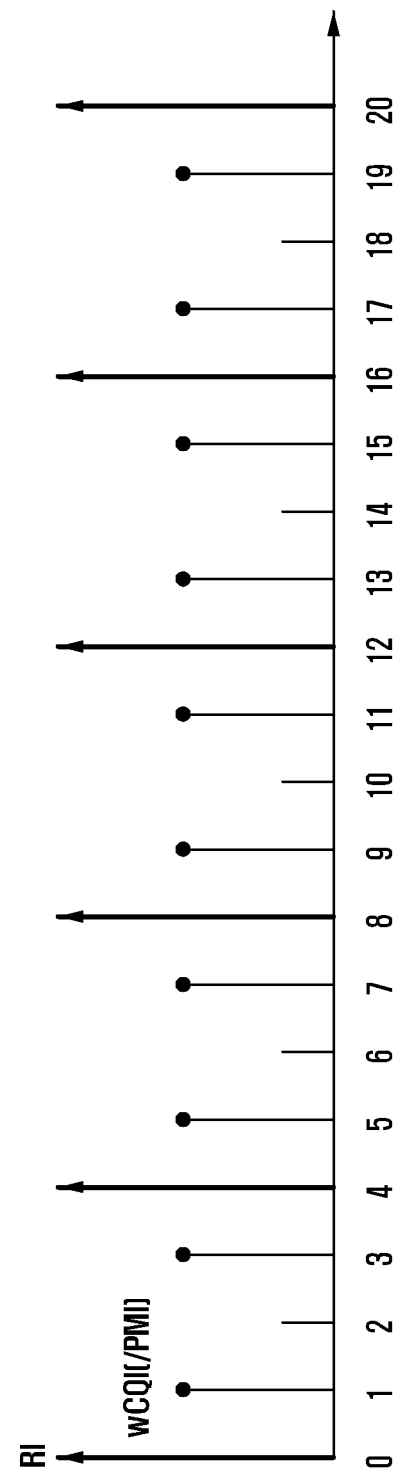
FIGS. 3 to 6 illustrate feedback timings in an LTE/LTE-A system.
Figure 4:
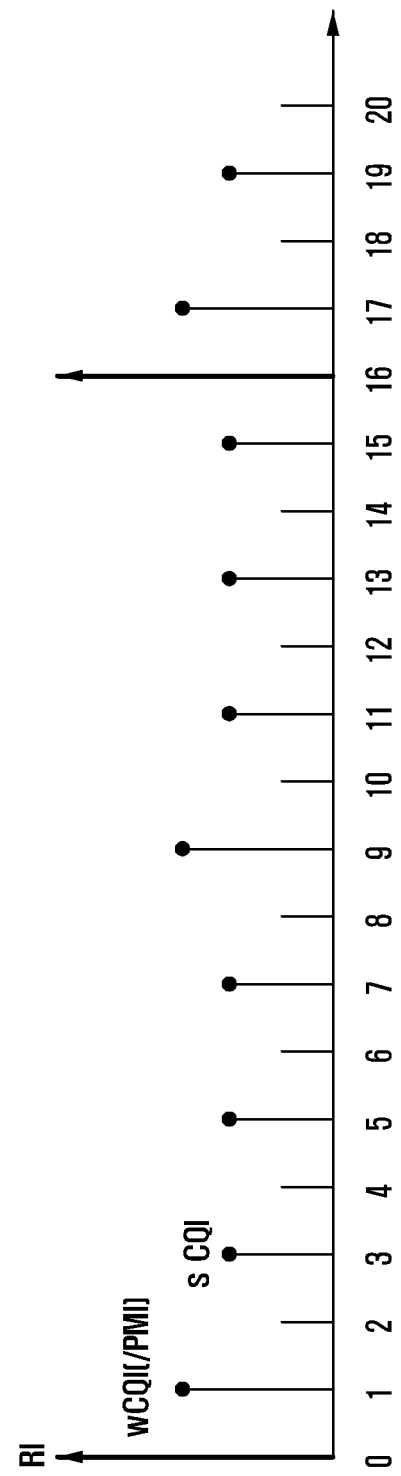
Figure 5:
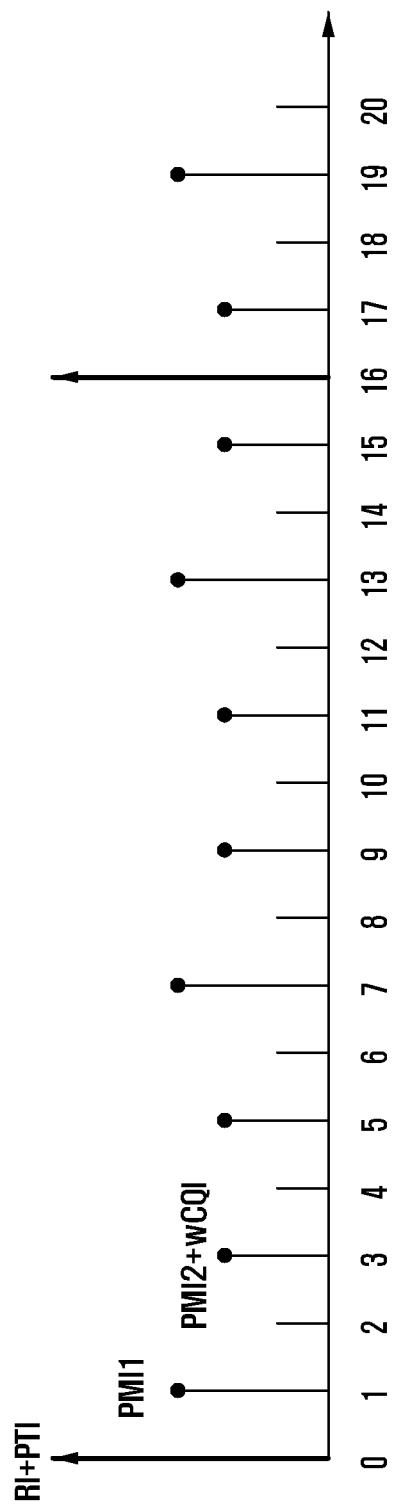
Figure 6:
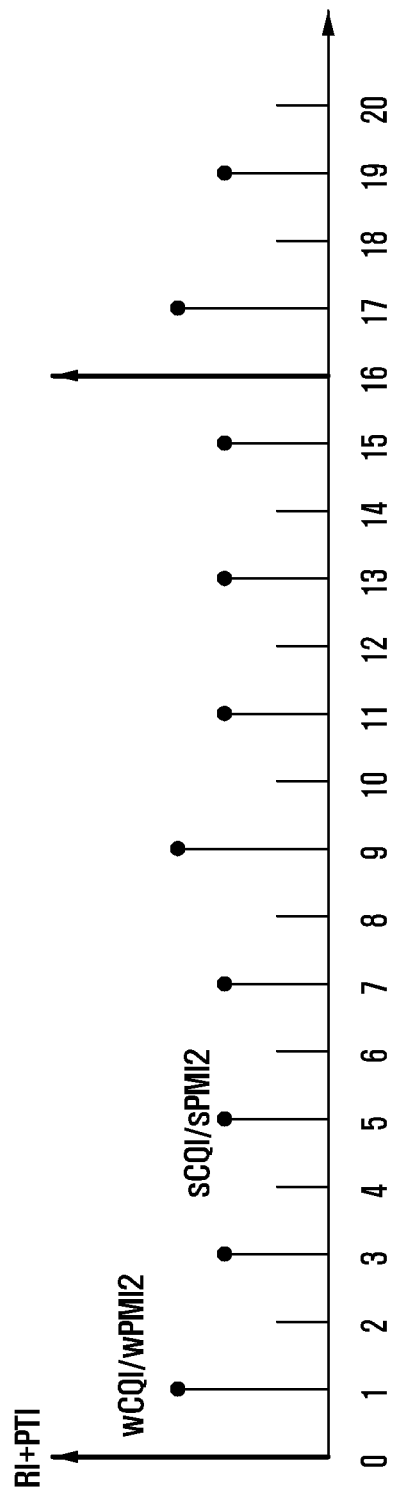

When an eNB uses a large number of transmit antennas to perform CSI-RS transmission, as in the case of FD-MIMO, to reduce the amount of feedback from a UE, it is possible to divide N antenna ports into G groups for CSI-RS transmission. For example, when transmit antennas of the eNB are arranged in two dimensions as shown in FIG. 1, the eNB may send antenna ports corresponding to each column to the UE by use of separate CSI-RS resources. In this case, the eNB may present the channel of each antenna to the UE by the use of G CSI-RSs.

The MIMO scheme of the present invention, as an advanced version of existing LTE/LTE-A MIMO with 8 transmit antennas, can be applied to a case where 16 or more transmit antennas are used, in particular, to a case where the transmit antennas of the base station are configured as a two dimensional antenna array.

In one embodiment of the present invention, each column in the two dimensional antenna array is operated for one CSI-RS. To make the principle of the present invention applicable, it is not required to divide the antenna ports on a column basis. However, in the following description, it is assumed that the antenna ports are divided on a column basis for CSI-RS operation for ease of description. The antenna ports may also be divided on a row basis or independently of columns or rows to form antenna port groups.

Figure 7:
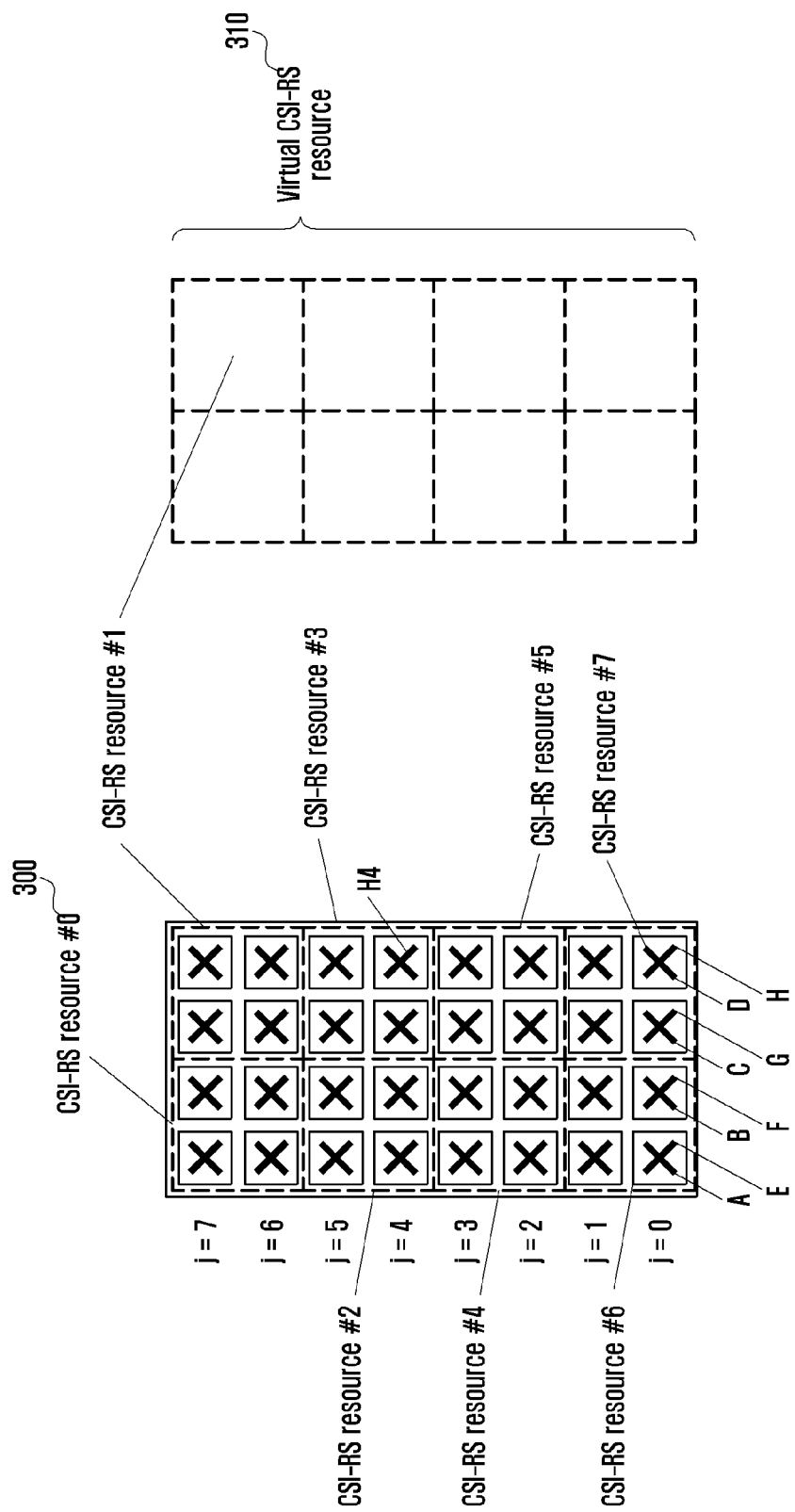
FIG. 7 Illustrates CSI-RS transmission according to an embodiment of the present invention.

FIG. 7 Illustrates CSI-RS transmission for a two dimensional (2D) antenna array according to an embodiment of the present invention.

In one embodiment of the present invention, an eNB operating a 2D antenna array Includes 64 total antenna ports (e.g. N=64). Among the 64 antenna ports, 32 antenna ports (e.g., A0, . . . , A7, B0, . . . , B7, C0, . . . , C7, D0, . . . , D7) are arranged to form an angle of −45° or 0° with the positive direction of the x-axis, and the remaining 32 antenna ports (e.g., E0, . . . , E7, F0, . . . , F7, G0, . . . , G7, H0, . . . , H7) are arranged to form an angle of +45' or 90° with the positive direction of the x-axis. The antenna configuration in which every two antenna elements located at the same position make an angle of 90° as above is referred to as a cross Polarization (or XPOL) configuration. The XPOL configuration may be used to obtain a large antenna gain by placing multiple antennas in a small space. FIG. 7 discloses another embodiment of the present Invention, i.e., each CSI-RS resource has a form of a square, as opposed to a form of a bar in the above embodiment.

Unlike the above case, an eNB operating a 2D antenna array may include total 32 antenna ports (e.g. N=32). In this case, 32 antenna ports (e.g., A0, . . . , A7, B0, . . . , B7, C0, . . . , C7, D0, . . . , D7) may be arranged to form an angle of −45° or 0° with the positive direction of the x-axis. The antenna configuration in which all antenna elements are arranged to make the same angle as above is referred to as a Co-Polarization (or Co-POL) configuration.

In the case of Co-Pol, as all antenna ports have the same orientation, when $N_{RI}$ denotes the number of receive antennas at a UE, N antenna ports are described by a channel matrix $H_1$ having a size of $N_{Rx} \times 32$ for one antenna group and the UE. In the case of XPOL, as the first antenna group with N/2 members and the second antenna group with N/2 members are arranged at the same location, the radio channels formed by the two antenna groups may have only a phase difference. That is, when $N_{Rx}$ denotes the number of receive antennas at the UE and the channel matrix with a size of $N_{Rx} \times 32$ for the first antenna group and the UE is $H_1$, the channel matrix $H_2$ for the second antenna group and the UE may be represented by a scalar product of $H_1$ as shown below in Equation (1).

$$H_2 = e^{j\phi} H_1 \qquad (1)$$

In this case, the (i,j)-component of $H_k$ indicates the channel value from the $j^{th}$ transmit antenna in the $k^{th}$ antenna group to the $i^{th}$ receive antenna.

In this case, 64 antennas are marked respectively by A0, . . . , A7, B0, . . . , B7, C0, . . . , C7, D0, . . . , D7, E0, . . . , E7, F0, . . . , F7, G0, . . . , G7, H0, . . . , H7. The 64 antenna ports send one CSI-RS for each column of the 2D antenna array.

First, a CSI-RS that causes a measurement of the channel states of each column of the 2D antenna array is composed of a CSI-RS resources 300 each having 8 antenna ports as follows:

CSI-RS resource 0 sends A6, A7, E6, E7, B6, B7, F0, and F7 (or A0, . . . A7 in FIG. 7), respectively, to 8 CSI-RS antenna ports;

CSI-RS resource 1 sends C6, C7, G6, G7, D6, D7, H6, and H7 (or B0, . . . B7 In FIG. 7), respectively, to 8 CSI-RS antenna ports;

CSI-RS resource 2 sends A4, A5, E4, E5, B4, B5, F4, and F5 (or C0, . . . C7 in FIG. 7), respectively, to 8 CSI-RS antenna ports;

CSI-RS resource 3 sends C4, C5, G4, G5, D4, D5, H4, and H5 (or D0, . . . D7 In FIG. 7), respectively, to 8 CSI-RS antenna ports;

CSI-RS resource 4 sends A2, A3, E2, E3, B2, B3, F2, and F3 (or E0, . . . E7 in FIG. 7), respectively, to 8 CSI-RS antenna ports;

CSI-RS resource 5 sends C2, C3, G2, G3, D2, D3, H2, and H3 (or F0, . . . F7 in FIG. 7), respectively, to 8 CSI-RS antenna ports;

CSI-RS resource 6 sends A0, A1, E0, E1, B0, B1, F0, and F1 (or G0, . . . G7 in FIG. 7), respectively, to 8 CSI-RS antenna ports; and CSI-RS resource 7 sends C0, C1, G0, G1, D0, D1, H0, and, H1 (or H0, . . . H7 in FIG. 7), respectively, to 8 CSI-RS antenna ports.

When multiple antennas are arranged in two dimensions as above (M×N, where M is a vertical direction or column and N is a horizontal direction or row), it is possible to measure FD-MIMO channels by use of N CSI-RSs each having M CSI-RS port resources.

The 64 transmit antennas of the above case perform CSI-RS transmission using 8 CSI-RSs each having 8 CSI-RS ports, enabling the UE to measure radio channels for all antenna ports of the 2D antenna array in the FD-MIMO system. Each CSI-RS causes a measurement of channels for one column with respect to columns of the 2D antenna array. Meanwhile, the UE measures channel states for multiple CSI-RSs sent as in the above case and notifies radio channel states of the FD-MIMO to the eNB by feeding the RI, PMI and CQI generated based on the measurement results back to the eNB.

Figure 8:
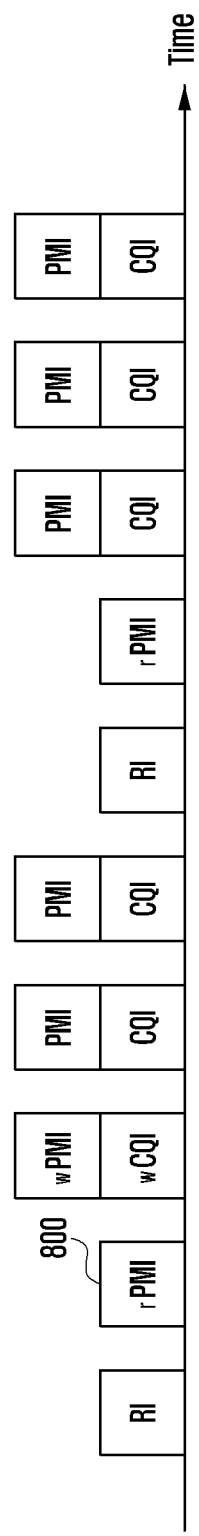
FIG. 8 illustrates RI, PMI and CQI transmission by a UE for two CSI-RSs.

FIG. 8 illustrates RI, PMI and CQI transmission by a UE for two CSI-RSs.

To feedback PMI information, the UE composes and sends first feedback information (e.g. feedback 1) separately for each CSI-RS by measuring channels associated with one column, and composes and sends second feedback information (e.g. feedback 2) indicating a relationship between the columns. In this case, transmission of the first feedback information includes measuring a CSI-RS configured for one column and sending RI, PMI and CQI information reflecting states of channels associated with the column of the 2D antenna array; and transmission of the second feedback information includes sending information on correlation or interrelation between pieces of the first feedback information composed for individual columns to the eNB. The second feedback information may be indicated in various ways. In the present invention, assuming that virtual channels created by PMIs configured for individual columns correspond to CSI-RS resources for the second feedback information, a description is given of a scheme that feeds back a relationship between the virtual channels by use of PMIs.

In this case, the RI, PMI and CQI are interrelated with one another. That is, the RI in the first feedback information may notify the rank and precoding matrix Indicated by PMIs sent afterwards as the first feedback. The RI and PMI sent as the first feedback may notify the number of channels and precoding matrix indicated by PMIs sent as the second feedback. The RI sent as the second feedback may notify the rank and precoding matrix indicated by PMIs sent as the second feedback. When the eNB transmits data of the rank indicated by the RI of the second feedback, and when the PMI sent as the first feedback is used for individual columns and the PMI sent as the second feedback is applied between columns, the CQI of the second feedback indicates the data rate available to the UE or a value corresponding to the data rate.

In the feedback scheme shown in FIG. 8, the UE may receive feedback allocation for FD-MIMO as follows.

First, the UE receives allocation of at least one CSI-RS resource (CSI-RS-1, . . . , CSI-RS-8). That is, the UE is instructed by the eNB to receive CSI-RS resources distinguished by columns for channel measurement. In this case, the UE may be unaware of the column of the 2D antenna array corresponding to a certain CSI-RS resource.

Thereafter, the UE receives feedback allocation through Radio Resource Control (RRC) information. For example, the RRC information for feedback allocation may be configured as in Table 1 below.

TABLE 1

Feedback Information (RRC)

CSI-RS resource information: CSI-RS-1, . . . , CSI-RS-8
Reporting mode
PMI codebook information for first feedback information
PMI codebook information for second feedback information
Etc . . .

In the RRC information for feedback, the PMI codebook information is information on a set of precoding matrixes available to the corresponding feedback. When no PMI codebook information is contained in the RRC information for feedback, the UE may determine that all precoding matrixes predefined in the standard are usable for feedback. The PMI codebook information may have the same or different information elements for the first feedback and the second feedback. In the feedback information shown in Table 1 above, the "Etc." information may include information on a period and offset for periodic feedback or information on interference measurement resources.

As shown in FIG. 8, configuring one feedback containing multiple CSI-RSs for multiple transmit antennas of the eNB structured as a 2D antenna array and instructing the UE to report channel state information to the eNB may be an example of a scheme for channel state information reporting for FD-MIMO.

In the scheme for channel state information reporting shown in FIG. 8, it is possible for the UE to generate and report channel state information for a 2D antenna array with fewer CSI-RS resources. However, this scheme may fail to make good use of the performance of the FD-MIMO system.

In the event that configuring one feedback for each of two CSI-RSs (CSI-RS1, CSI-RS2) as shown in FIG. 8 and instructing the UE to measure channel states for one column and one row through some antenna ports and report channel state information for the remaining antenna ports obtained via channel estimation like a Kronecker product (i.e., an operation on two matrixes of arbitrary size resulting in a block matrix) based on the measurement result, as the UE utilizes estimated information without observing all antenna ports, the performance of the FD-MIMO system may not be sufficiently extracted.

This is described in more detail as follows. For example, if $$H_H = \begin{bmatrix} h_1^{(H)} \\ \vdots \\ h_{N_{Rx}}^{(H)} \end{bmatrix}$$

is the $N_{Rx} \times N_H$ channel matrix estimated by the UE through CSI-RS-1 and $$H_V = \begin{bmatrix} h_1^{(V)} \\ \vdots \\ h_{N_{Rx}}^{(V)} \end{bmatrix}$$

is the $N_{Rx} \times N_V$ channel matrix estimated by the UE through CSI-RS-2, the $N_{Rx} \times (N_H N_V)$ channel matrix for $N=N_H N_V$ transmit antennas in two dimensions may be represented as Equation (2) below.

$$H_{HV} = \gamma \begin{bmatrix} h_1^{(H)} \otimes h_1^{(V)} \\ \vdots \\ h_{N_{Rx}}^{(V)} \otimes h_{N_{Rx}}^{(V)} \end{bmatrix} \quad (2)$$

In Equation (2) above, γ is a scalar value representing the influence of antenna virtualization on a horizontal and vertical antenna basis as a channel value. The value γ may be separately notified by the eNB or precomputed as 1 during CSI-RS channel estimation. In addition, ⊗ denotes the Kronecker product of matrixes. The Kronecker product of matrixes A and B is represented as Equation (3) below.

$$A \otimes B = \begin{bmatrix} a_{11}B & \cdots & a_{1n}B \\ \vdots & \ddots & \vdots \\ a_{m1}B & \cdots & a_{mn}B \end{bmatrix}, \quad (3)$$

In Equation (3) above, $$A = \begin{bmatrix} a_{11} & \cdots & a_{1n} \\ \vdots & \ddots & \vdots \\ a_{m1} & \cdots & a_{mn} \end{bmatrix},$$

In this case, entries of $\alpha_{ij}$ only when i=m or j=1 are related to actually measured channels and the remaining entries are channel values generated by the Kronecker product. Such channel estimation errors may cause performance degradation.

In a 2D antenna array system, when the transmit antennas are arranged in two dimensions, both precoding in the vertical direction and precoding in the horizontal direction are applied to signals to be sent to the UE. In this case, when the UE applies precoding corresponding to the $PMI_H$ and $PMI_V$ using some antenna ports only as shown in FIG. 8, the eNB may apply wrong PMIs to the other antenna ports. This may cause degradation of system performance.

Accordingly, in an embodiment of the present invention, the eNB divides antenna ports related with a 2D antenna array into one or more groups and transmits reference signals to the UE by use of one or more reference signal resources. The UE measures these reference signals, generates feedback information on a group basis for all the antenna ports, and reports the feedback information to the eNB. In addition, the UE reports additional feedback information describing a relationship between the groups to the eNB, so that the eNB may perform transmission to the UE in an optimal manner. To this end, a scheme for reporting rank, precoding and CQI information is considered. That is, in the present invention, a feedback scheme suitable for a 2D antenna array structure is designed, and a scheme enabling the UE to generate and report feedback information for FD-MIMO utilizing the feedback scheme is provided. In the description, a set of precoding matrixes defined between the eNB and UE is referred to as a "codebook," and each precoding matrix in the codebook may be referred to as a "codeword." The codebook is composed of a set of precoding matrixes with respect to each supportable rank, and selection of a specific precoding matrix corresponds to selection of a specific rank.

In the present invention, antenna ports may be divided into groups in various ways. For example, grouping may be performed so that adjacent or non-adjacent antenna ports belong to the same group. In the following embodiments of the present invention, for ease of description, it is assumed that antenna ports on the same column of the 2D antenna array structure are transmitted by using one CSI-RS resource. In the present invention, grouping may also be formed on the basis of antenna ports on the same row or on the basis of antenna ports randomly selected regardless of columns or rows. In addition, one antenna port may be associated with one or more adjacent or non-adjacent antenna elements.

In an embodiment of the present invention, a UE performs channel estimation for each column of a 2D antenna array on the basis of one or more configured CSI-RSs and selects an optimum precoding matrix for the column from a codebook. Thereafter, the UE selects an optimum precoding matrix from the codebook on the basis of the resulting relationship between the columns and generates and reports an RI, PMI and CQI.

As described above, among 64 total antennas arranged as a 2D antenna array, CSI-RSs differing from each other with respect to a positive direction of an x-axis are configured for individual columns forming 8 antenna groups for channel measurement. In this case, the channel matrix with a size of $N_{Rx} \times 8$ between the first antenna port column and the UE may be represented as $H_1$, the channel matrix with a size of $N_{Rx} \times 8$ between the second antenna port column and the UE may be represented as $H_2$, and the channel matrix with a size of $N_{Rx} \times 8$ between the $n^{th}$ antenna port column and the UE may be represented as $H_x$.

A description is given below of the selection of an optimum precoding matrix for one column of the channel matrix. A scheme to select a precoding matrix maximizing the Signal-to-Noise Ratio (SNR) may be represented as Equation (4) below.

$$\hat{P}_n = \underset{P}{\operatorname{argmax}} \|H_n P\| \quad (4)$$

In Equation (4) above, P refers to a set of 8×n precoding matrixes. P is a set of 8×n beamforming vectors and Is combined with the channel matrix $H_x$ to form beams of signals propagating in desired directions. In this case, n is a rank of the precoding matrix, and n=1 Indicates a rank-1 precoding matrix and n=2 indicates a rank-2 precoding matrix. In Equation (4) above, precoding matrixes maximizing the SNR are different for different columns and the UE selects N total instances of $\hat{p}_n$.

Thereafter, the UE composes virtual ports $$\begin{bmatrix} H_0 \hat{P}_0 \\ \cdots \\ H_n \hat{P}_n \end{bmatrix}$$

for N CSI-RS resources using $\hat{p}_n$ selected for 8 CSI-RS resources, and measures virtual channels. In this case, the virtual channels may be represented as a channel matrix with a size of $N_{Rx} \times V$ between virtual ports and the UE, and the number of virtual ports v may be represented as a sum of n for each CSI-RS resource.

The UE selects an optimum precoding matrix specifying the relationship between port groups (e.g. port columns) by using Equation (5) below. In this case, selection of a precoding matrix maximizing the SNR may be represented by Equation (5) as follows.

$$\hat{p}' = \underset{p}{\operatorname{argmax}} \left\| \begin{bmatrix} H_0 \hat{P}_0 \\ \cdots \\ H_n \hat{P}_n \end{bmatrix} P \right\| \quad (5)$$

In this case, P is a v×n' precoding matrix. P is a v×n' vector between port groups and combines with the virtual channel matrix so that transmission is performed so as to maximize signal reception performance. In this case, n' is the rank for the precoding matrix, and n'=1 indicates a rank-1 precoding matrix and n'=2 indicates a rank-2 precoding matrix. In Equation (5) above, the precoding matrix maximizing the SNR uses codebooks of different sizes according to the number of virtual ports v, and an optimum $\hat{p}'$ is selected accordingly.

Consequently, the UE feeds back N instances of $\hat{p}_n$ and one instance of $\hat{p}'$ for PMI feedback. For the rank, the UE feeds back the rank after $\hat{p}_n$ is applied for each column and $\hat{p}'$ is applied between columns. For CQI feedback, the UE determines the CQI and reports the same to the eNB after $\hat{p}_n$ selected for each column and $\hat{p}'$ selected between columns are applied.

The feedback of the present invention may be reported to the eNB as follows. In this case, it is assumed that $\hat{p}_n$ is sent as rPMI, $\hat{p}'$ is sent as wPMI, and the CQI is sent as the wCQI.

The period for rPMI feedback is $N_{pd}$ and the offset is $N_{OFFSET,CQI}$. The period for wCQI feedback is $H \cdot N_{pd}$ and the offset is $N_{OFFSET,CQI}$, which is identical to that of the rPMI. In this case, H=J·K+1 and K is sent through higher layer signaling, and J is a value determined based on the 2D antenna array configuration or the number of CSI-RS resources. For example, J is set to 8 for 64 antennas. That is, the wCQI is transmitted once at every H rPMI transmissions as a replacement of the rPMI. The period for RI feedback is $M_{RI} \cdot H \cdot N_{pd}$ and the offset is $N_{OFFSET,CQI} + N_{OFFSET,RI}$. At each rPMI transmission timing, rPMIs for CSI-RS resources may be sent sequentially or simultaneously. In the case of 64 antennas, rPMI transmission may be performed sequentially with J=8 or simultaneously with J=8.

For the rank, the UE may send both n and n' or send n' only. When only n' is sent, n may be set to a fixed value such as 1 or 2. In this case, the UE may use one value notified by the eNB in advance through higher layer signaling or pre-stored in a memory.

In the scheme of an embodiment of the present invention, the UE measures channels for multiple CSI-RS resources and feeds back information regarding the optimum beam selected for each CSI-RS resource and optimum relationship between the beams, so that the eNB utilizing a 2D antenna array may select a beam in an optimum manner. In this scheme, the UE divides up to 64 antenna channels into 8 groups for channel measurement and composes virtual channels for feedback, effectively reducing the amount of feedback and channel reception complexity. The size of a codebook corresponding to the virtual channels may vary according to the sum of ranks selected for individual CSI-RS resources.

In an embodiment of the present invention, a UE performs channel estimation for each column of a 2D antenna array on the basis of one or more configured CSI-RSs and selects an optimum precoding matrix for all the columns from a codebook. Thereafter, the UE selects an optimum precoding matrix from the codebook on the basis of the resulting relationship between the columns and generates and reports the RI, PMI and CQI.

As described above, among 64 total antennas structured as a 2D antenna array, CSI-RSs differing from each other with respect to a positive direction of an x-axis are configured for individual columns forming 8 antenna groups for channel measurement. In this case, the channel matrix with a size of $N_{Rx} \times 8$ between the first antenna port column and the UE may be represented as $H_1$, the channel matrix with a size of $N_{Rx} \times 8$ between the second antenna port column and the UE may be represented as $H_2$, and the channel matrix with a size of $N_{Rx} \times 8$ between the $n^{th}$ antenna port column and the UE may be represented as $H_x$.

A description is given below of the selection of an optimum precoding matrix for one column of the channel matrix. A scheme to select a precoding matrix maximizing the SNR may be represented as Equation (6) below.

$$\hat{p} = \underset{p}{\mathrm{argmax}} \sum_n \|H_n P\| \qquad (6)$$

In Equation (6) above, P refers to a set of 8×n precoding matrixes. P is a set of 8×n beamforming vectors and is combined with the channel matrix $H_x$ to form beams of signals propagating toward desired directions. Here, n is the rank for the precoding matrix, and n=1 indicates a rank-1 precoding matrix and n=2 indicates a rank-2 precoding matrix. In Equation (6) above, precoding matrixes maximizing the SNR are the same for individual columns and the UE selects one total instance of $\hat{p}_n$.

Thereafter, the UE composes virtual ports $$\begin{bmatrix} H_0 \hat{p} \\ \cdots \\ H_n \hat{p} \end{bmatrix}$$

for N CSI-RS resources using $\hat{p}_n$ selected for 8 CSI-RS resources, and measures virtual channels. In this case, the virtual channels may be represented as a channel matrix with a size of $N_{Rx} \times v$ between virtual ports and the UE, and the number of virtual ports v may be represented as a sum of rank n of $\hat{p}$ determined for each CSI-RS resource.

The UE selects an optimum precoding matrix specifying the relationship between port groups (e.g. port columns) by using Equation (7) below. In this case, the selection of a precoding matrix maximizing the SNR may be represented as Equation (7) below.

$$\hat{p}' = \underset{p}{\mathrm{argmax}} \left\| \begin{bmatrix} H_0 \hat{p} \\ \cdots \\ H_n \hat{p} \end{bmatrix} P \right\| \qquad (7)$$

In this case, P is a v×n' precoding matrix. P is a v×n' vector between port groups and combines with the virtual channel matrix so that transmission is performed so as to maximize signal reception performance. Here, n' is the rank for the precoding matrix, and n'=1 indicates a rank-1 precoding matrix and n'=2 indicates a rank-2 precoding matrix. In Equation (7) above, the precoding matrix maximizing the SNR uses codebooks of different sizes according to the number of virtual ports v, and optimum $\hat{p}'$ is selected accordingly.

Consequently, the UE feeds back one instance of $\hat{p}$ and one instance of $\hat{p}'$ for PMI feedback. For the rank, the UE feeds back the rank after $\hat{p}$ is applied for each column and $\hat{p}'$ is applied between columns. For CQI feedback, the UE determines the CQI and reports the same to the eNB after $\hat{p}$ selected for each column and $\hat{p}'$ selected between columns are applied.

The feedback of the present invention may be reported to the eNB as follows. In this case, it is assumed that $\hat{p}$ is sent as rPMI, $\hat{p}'$ is sent as wPMI, and the CQI is sent as the wCQI.

The period for rPMI feedback is $N_{pd}$ and the offset is $N_{OFFSET,CQI}$. The period for wCQI feedback is $H \cdot N_{pd}$ and the offset is $N_{OFFSET,CQI}$, identical to that of the rPMI. In this case, $H = J \cdot K + 1$ and K is sent through higher layer signaling, and J is a value determined based on the 2D antenna array configuration or the number of CSI-RS resources. For example, J is set to 1 for 64 antennas. That is, the wCQI and wPMI are transmitted once at every H rPMI transmissions as a replacement of the rPMI. The period for RI feedback is $M_{RI} \cdot H \cdot N_{pd}$ and the offset is $N_{OFFSET,CQI} + N_{OFFSET,RI}$.

As another scheme, feedback timing may be determined so that the period for wCQI and wPMI transmission is $N_{pd}$ with a subframe offset of $N_{OFFSET,CQI}$. The period of RI, rPMI transmission is $N_{pd} \cdot M_{RI}$ with an offset of $N_{OFFSET,CQI} + N_{OFFSET,RI}$.

In the scheme of an embodiment of the present invention, the UE measures channels for multiple CSI-RS resources and feeds back information regarding the optimum beam selected for each CSI-RS resource and optimum relationship between the beams, so that the eNB utilizing a 2D antenna array may select beams in an optimum manner. In this scheme, the UE divides up to 64 antenna channels into 8 groups for channel measurement, applies one codebook, and composes virtual channels for feedback. Thereby, in the case of high channel correlation between antennas, it is possible to effectively reduce the amount of feedback and channel reception complexity.

In an embodiment of the present invention, the UE performs channel estimation for each column of the 2D antenna array on the basis of one or more configured CSI-RSs and selects an optimum precoding matrix for the column from a codebook. Thereafter, the UE selects an optimum precoding matrix from the codebook on the basis of the resulting relationship between the columns and generates and reports the RI, PMI and CQI.

As described above, among 64 total antennas structured as a 2D antenna array, CSI-RSs differing from each other with respect to a positive direction of an x-axis are configured for individual columns forming 8 antenna groups for channel measurement. In this case, the channel matrix with a size of $N_{Rx} \times 8$ between the first antenna port column and the UE may be represented as $H_1$, the channel matrix with a size of $N_{Rx} \times 8$ between the second antenna port column and the UE may be represented as $H_2$, and the channel matrix with a size of $N_{Rx} \times 8$ between the $n^{th}$ antenna port column and the UE may be represented as $H_x$.

Precoding matrixes in the codebook may be represented in terms of two indexes as in Equation (8) below.

$$P(i_1, i_2) = W_1(i_1) W_2(i_2) \quad (8)$$

where $W_1(i_1) = \begin{bmatrix} X(i_1) & 0 \\ 0 & X(i_1) \end{bmatrix}$, $X(i_1) = \lfloor p_i^{(i_1)} \cdots p_M^{(i_1)} \rfloor$, $p_m^{(i_1)} \in \{c_0, c_1, \ldots, c_{Q-1}\}$, and $W_2(i_2) = \frac{1}{\sqrt{2}} \begin{bmatrix} e_m \\ \alpha^k e_m \end{bmatrix}$, $\alpha = e^{-\frac{j2\pi}{K}}$, $i_2 = K(m-1) + k$, $m = 1, 2, \ldots, M, k = 0, 1, \ldots, K-1$ In this case, $c_Q$ refers to $$\frac{N}{2} \times 1$$

beamforming vectors for $N/2$ antennas with the same angle in one antenna group for the XPOL configuration, and it is assumed that Q beamforming vectors are available in Equation (8) above. $e_m$ Indicates a unit vector whose $m^{th}$ component is 1 and other components are 0, and serves to select the $m^{th}$ column $p_m^{(i_1)}$ of the block diagonal matrix $X(i_1) = \lfloor p_1^x \cdots p_M^{(i_1)} \rfloor$ as a beamforming vector. That is, after the index $(i_1, i_2)$ is determined, the combined precoding matrix may be represented as Equation (9) below.

$$P(i_1, i_2) = W_1(i_1) W_2(i_2) = \begin{bmatrix} p_m^{(i_1)} \\ e^{-\frac{j2\pi}{K}k} p_m^{(i_1)} \end{bmatrix}, \quad (9)$$

where $i_2 = K(m-1) + k$

In this case, the index $(i_1, i_2)$ determining the precoding matrix may have the following properties.

First, $i_1$ indicates M candidate beamforming vectors selectable for the current channel among all beamforming vectors of the codebook. $i_2$ serves to select an optimum beamforming vector suitable for the current channel among the candidate beamforming vectors indicated by $i_1$ and to adjust the phase between different antenna groups. Hence, when the channel for each column is represented as $P(i_1, i_2) = W_1(i_1) W_2(i_2)$, as $i_1$ indicates M candidate beamforming vectors selectable for the current channel among all beamforming vectors of the codebook, the same $i_1$ may be selected. The UE may derive a precoding matrix $\hat{p}_n$ maximizing the SNR which may be represented as Equation (10) below.

The UE selects $i_1$ for each column in Equation (10) as follows.

$$\hat{i}_1 = \underset{i_1}{\mathrm{argmax}} \Sigma \| H_n P(i_1, i_2) \| \quad (10)$$

The UE selects $i_2$ for each column on the basis of the selected $i_1$ in Equation (11) as follows.

$$\hat{i}_{2,n} = \underset{i_2}{\mathrm{argmax}} \| H_n P(i_1, i_2) \| \quad (11)$$

In this case, $P(i_1, i_2)$ is a $8 \times n$ precoding matrix. $P(i_1, i_2)$ is a $8 \times n$ beamforming vector and combines with the channel matrix $H_x$ so as to form beams of signals propagating in desired directions. In this case, n is the rank for the precoding matrix, and n=1 Indicates a rank-1 precoding matrix and n=2 Indicates a rank-2 precoding matrix. In Equation (11) above, precoding matrixes maximizing the SNR are different for different columns and the UE selects N total instances of $P(\hat{i}_1, \hat{i}_{2,n})$.

Thereafter, the UE composes virtual ports $$\begin{bmatrix} H_0 P(\hat{i}_1, \hat{i}_{2,0}) \\ \cdots \\ H_n P(\hat{i}_1, \hat{i}_{2,n}) \end{bmatrix}$$

for N CSI-RS resources using $P(\hat{i}_1, \hat{i}_{2,n})$ selected for 8 CSI-RS resources, and measures virtual channels. In this case, the virtual channels may be represented as a channel matrix with a size of $N_{Rx} \times v$ between virtual ports and the UE, and the number of virtual ports v may be represented as a sum of n for each CSI-RS resource. The UE selects an optimum precoding matrix specifying the relationship between port groups by using Equation (12) below. When $P(i_1, i_2) = W_1(i_1) W_2(i_2)$, $i_1$ and $i_2$ may be derived as in Equation (12) below where $i_1$ relates to virtual CSI-RS resources configured for each column and $i_2$ relates to beamforming vectors in the codebook.

The UE selects $i_1$ as in Equation (12) as follows.

$$\hat{i}_1' = \underset{i_1}{\mathrm{argmax}} \left\| \begin{bmatrix} H_0 P(\hat{i}_1, \hat{i}_{2,0}) \\ \cdots \\ H_n P(\hat{i}_1, \hat{i}_{2,n}) \end{bmatrix} P(i_1, i_2) \right\| \quad (12)$$

The UE selects $i_2$ for each column on the basis of selected $i_1$ as in PE Equation (13) as follows.

$$\hat{i}_2' = \underset{i_2}{\mathrm{argmax}} \left\| \begin{bmatrix} H_0 P(\hat{i}_1, \hat{i}_{2,0}) \\ \cdots \\ H_n P(\hat{i}_1, \hat{i}_{2,n}) \end{bmatrix} P(i_1, i_2) \right\| \quad (13)$$

In this case, $P(\hat{i}_1', \hat{i}_2')$ is a $v \times n'$ precoding matrix. $P(\hat{i}_1', \hat{i}_2')$ is a $v \times n'$ vector between port groups and is combined with the virtual channel matrix so that transmission is performed so as to maximize signal reception performance. In this case, n' is the rank for the precoding matrix, and n'=1 indicates a rank-1 precoding matrix and n'=2 indicates a rank-2 precoding matrix. In Equation (13) above, the precoding matrix maximizing the SNR uses codebooks of different sizes according to the number of virtual ports v, and the optimum $P(\hat{i}_1', \hat{i}_2')$ is selected accordingly.

Consequently, the UE feeds back one instance of $\hat{i}_1$ and N Instances of $\hat{i}_2$, and one instance of $\hat{i}_1'$ and one instance of $\hat{i}_2'$ for PMI feedback. For the rank, the UE feeds back the rank after $P(\hat{i}_1,\hat{i}_2)$ is applied for each column and $P(\hat{i}_1',\hat{i}_2')$ is applied between columns. For CQI feedback, the UE determines the CQI and reports the same to the eNB after $P(\hat{i}_1,\hat{i}_2)$ selected for each column and $P(\hat{i}_1',\hat{i}_2')$ selected between columns are applied.

The feedback of the present invention may be reported to the eNB as follows. In this case, it is assumed that $P(\hat{i}_1,\hat{i}_2)$ is sent as rPMI, $P(\hat{i}_1',\hat{i}_2')$ is sent as wPMI, and the CQI is sent as the wCQI. The rPMI and wPMI both indicate that $\hat{i}_1$ and $\hat{i}_1'$ are sent as the first PMI and $\hat{i}_2$ and $\hat{i}_2'$ are sent as the second PMI.

The scheme of the present invention may estimate channels for N×M transmit antennas arranged in two dimensions by use of N CSI-RS resources, generate PMI $i_1$ and PMI $i_2$ specifying N optimum ranks and associated precoding matrixes, and generate rank, $i_1$, $i_2$ and CQI specifying N optimum precoding matrixes. The UE reports the determined rank, $i_1$, $i_2$, and CQI at preset timings to the eNB. Then, the eNB may be aware of channel state information of the UE with reference to the predefined codebook and utilize the identified Information to perform data scheduling for the UE. In this case, the rank, $i_1$, $i_2$, and CQI may be reported at the same timing together with uplink data or may be reported at different timings via an uplink control channel. In particular, when $i_1$ and $i_2$ are reported at different timings, it is preferable that the transmission period of $i_1$ be greater than that of $i_2$. That is, $i_1$ being reported less frequently may remind the eNB of the set of beamforming vectors available, and $i_2$ being reported more frequently may enable the eNB to select optimum beamforming vectors suitable to actual fading channels and adjust the phase between antenna groups. In this case, $i_1$ indicates M candidate beamforming vectors selectable for the current channel among all beamforming vectors of the codebook, and $i_2$ serves to select a beamforming vector for actual use and to adjust the phase between different antenna groups.

The RI is transmitted together with first PMI information (e.g., rPMI and wPMI) and the wCQI is transmitted together with second PMI information. The feedback period for the wCQI and the second PMI is $H \cdot N_{pd}$ and the offset is $N_{OFFSET,CQI}$. In this case, H=J·K+1 and K are sent through higher layer signaling, and J is a value determined based on the 2D antenna array configuration or the number of CSI-RS resources. For example, J is set to 8 for 64 antennas. That is, the wCQI and wPMI are transmitted once at every H second PMI (e.g. rPMI) transmissions as a replacement of the rPMI. The feedback period for the RI and first PMI (e.g., rPMI and wPMI) is $M_{RI} \cdot H \cdot N_{pd}$ and the offset is $N_{OFFSET,CQI} + N_{OFFSET,RI}$. In this case, if the precoding matrix corresponding to the first PMI is $W_1$ and the precoding matrix corresponding to the second PMI is $W_2$, the UE and the eNB share the information indicating that the precoding matrix preferred by the UE is determined as $W_1 W_2$.

As another feedback scheme, the feedback information may further include Precoding Type Indicator (PTI) information. In this case, the PTI is transmitted together with the RI at a period of $M_{RI} \cdot H \cdot N_{pd}$ with an offset of $N_{OFFSET,CQI} + N_{OFFSET,RI}$.

For example, for PTI=0, all the first PMI (e.g., rPMI and wPMI), second PMI and wCQI may be fed back. In this case, the wCQI and second PMI (e.g., rPMI and wPMI) are sent together at the same timing at a period of NM with an offset of $N_{OFFSET,CQI}$. The first PMI is transmitted at a period of $H' \cdot N_{pd}$ with an offset of $N_{OFFSET,CQI}$. Here, H' is transmitted via higher layer signaling.

For PTI=1, the PTI and RI are transmitted together. In this case, the wCQI and second PMI (e.g., rPMI and wPMI) are transmitted together, and the sCQI is also transmitted at a separate timing. In this case, the first PMI is not transmitted. The PTI and RI are transmitted at the same period with the same offset as the case of PTI=0. The sCQI is transmitted at a period of $N_{pd}$ with an offset of $N_{OFFSET,CQI}$. The wCQI and second PMI are transmitted at a period of $H \cdot N_{pd}$ with an offset of $N_{OFFSET,CQI}$, and H is set to the same value as the case of 4 CSI-RS antenna ports.

In an embodiment of the present invention, PTI=00 indicates transmission of the first PMI (e.g. rPMI), PTI=01 Indicates transmission of the first PMI (e.g. wPMI), PTI=10 indicates transmission of the second PMI (e.g. rPMI), and PTI=11 indicates transmission of the second PMI (e.g. wPMI).

In an embodiment of the present invention, PTI=00 indicates transmission of the first PMI (e.g. rPMI and wPMI), PTI=01 indicates transmission of the second PMI (e.g. rPMI), PTI=10 indicates transmission of the second PMI (e.g. wPMI), and PTI=11 indicates transmission of all PMIs.

The feedback scheme of the present invention may include the feedback scheme of one of the various embodiments of the present invention or a combination thereof with respect to feedback for each CSI-RS and feedback between CSI-RSs. Such a combined scheme may be utilized when the configuration of the 2D antenna array varies.

In an embodiment of the present invention, the UE performs channel estimation for each of one or more CSI-RS feedback configurations, selects an optimum precoding matrix from the codebook, and generates and reports the RI, PMI and CQI. In addition, the UE selects an optimum precoding matrix from the codebook on the basis of the resulting relationship between the CSI-RS feedback configurations, and generates and reports the RI, PMI and CQI.

The UE identifies one or more feedback configurations based on CSI-RSs. The feedback configuration may be composed of the whole or a portion of RRC information as shown in Table 2 below.

TABLE 2

| Feedback Configuration #1 |
| --- |
| Channel information: CSI-RS-1 |
| Reporting (feedback) mode |
| PMI codebook information |
| Etc . . . |
| Feedback Configuration #2 |
| Channel information: CSI-RS-2 |
| Reporting (feedback) mode |
| PMI codebook information |
| Etc . . . |
| Feedback Configuration #N |
| Channel information: CSI-RS-N |
| Reporting (feedback) mode |
| PMI codebook information |
| Etc . . . |

The UE identifies one piece of feedback configuration information based on CSI-RS feedback configurations. The feedback configuration may be composed of the whole or a portion of RRC information as shown in Table 3 below.

TABLE 3

Feedback Configuration #N + 1

Channel information: CSI-RS feedback configuration
1, #2, . . . , #N
Reporting (feedback) mode
PMI codebook information
Etc . . .

The UE receives information on CSI-RS feedback configurations differing with each other with respect to the positive direction of the x-axis for individual columns forming 8 antenna groups among 64 total antennas structured as a 2D antenna array, and performs channel measurement for N CSI-RS resources. In this case, the channel matrix with a size of $N_{Rx} \times 8$ between the first CSI-RS feedback configuration and the UE may be represented as $H_1$, the channel matrix with a size of $N_{Rx} \times 8$ between the second CSI-RS feedback configuration and the UE may be represented as $H_2$, and the channel matrix with a size of $N_{Rx} \times 8$ between the $n^{th}$ CSI-RS feedback configuration and the UE may be represented as $H_x$.

A description is given of selection of an optimum precoding matrix for the channel matrix measured at the CSI-RS feedback configuration. Here, a scheme to select a precoding matrix maximizing the Signal-to-Noise Ratio (SNR) may be represented as Equation (14) below.

$$\hat{p}_n = \underset{p}{\mathrm{argmax}} \|H_n P\| \quad (14)$$

In Equation (14) above, P refers to a set of 8×n precoding matrixes. P is a set of 8×n beamforming vectors and is combined with the channel matrix $H_n$ so as to form beams of signals propagating in desired directions. In this case, n is the rank for the precoding matrix, and n=1 indicates a rank-1 precoding matrix and n=2 indicates a rank-2 precoding matrix. In Equation (14) above, precoding matrixes maximizing the SNR are different for different columns and the UE selects N total instances of $\hat{p}_n$. Consequently, for PMI feedback, the UE feeds back N instances of $\hat{p}_n$ for N feedback configurations. For the rank, the UE feeds back the rank after $\hat{p}_n$ is applied. For CQI feedback, the UE determines the CQI and reports the same to the eNB after the rank and $\hat{p}_n$ selected for each CSI-RS feedback configuration are applied.

Thereafter, the UE composes virtual ports $$\begin{bmatrix} H_0 \hat{P}_0 \\ \cdots \\ H_n \hat{P}_n \end{bmatrix}$$

for N CSI-RS resources using $\hat{p}_n$ selected for 8 CSI-RS feedback configurations, and measures virtual channels for the $N+1^{th}$ CSI-RS feedback configuration. In this case, the virtual channels may be represented as a channel matrix with a size of $N_{Rx} \times v$ between virtual ports and the UE, and v may be represented as a sum of n for each CSI-RS resource determined at one CSI-RS feedback configuration.

The UE selects an optimum precoding matrix specifying the relationship between the CSI-RS feedback configurations by using Equation (15) below. In this case, selection of a precoding matrix maximizing the SNR may be represented as in Equation (15) as follows.

$$\hat{p}' = \underset{p}{\mathrm{argmax}} \left\| \begin{bmatrix} H_0 \hat{P}_0 \\ \cdots \\ H_n \hat{P}_n \end{bmatrix} P \right\| \quad (15)$$

In this case, P is a v×n' precoding matrix. P is a v×n' vector between port groups and is combined with the virtual channel matrix so that transmission is performed so as to maximize signal reception performance. In this case, n' is the rank for the precoding matrix, and n'=1 indicates a rank-1 precoding matrix and n'=2 indicates a rank-2 precoding matrix. In Equation (15) above, the precoding matrix maximizing the SNR uses codebooks of different sizes according to the number of virtual ports v, and the optimum $\hat{p}'$ is selected accordingly.

Consequently, the UE feeds back one instance of $\hat{p}'$ for PMI feedback. For the rank, the UE feeds back the rank after $\hat{p}'$ is applied. For CQI feedback, the UE determines the CQI and reports the same to the eNB after the selected rank and $\hat{p}'$ are applied.

The feedback of the present invention may be reported to the eNB as follows. In this case, it is assumed that the PMI for each CSI-RS feedback configuration is sent as wPMI and the CQI is sent as the wCQI. Feedback may be performed by applying the feedback mode described before for each CSI-RS feedback configuration:

reporting mode 1-0 reports RI and wideband CQI (wCQI);
reporting mode 1-1 reports RI, wCQI, and PMI;
reporting mode 2-0 reports RI, wCQI, and subband CQI (sCQI); and
reporting mode 2-1 reports RI, wCQI, sCQI, and PMI.

For the rank, the UE may send both n and n' or send n' only. When n' is sent, n may be set to a fixed value such as 1 or 2. In this case, the UE may use one value notified by the eNB in advance through higher layer signaling or pre-stored in a memory.

In an embodiment of the present invention, the UE measures channels for multiple CSI-RS resources and reports this information to the eNB, feeds back information regarding the optimum beam selected for each CSI-RS resource and optimum relationship between the beams when the reported beams are simultaneously used, so that the eNB utilizing a 2D antenna array may select a beam in an optimum manner. In this scheme, the UE may feed back channel information regardless of antenna configuration Information of the eNB, by dividing multiple antenna channels into 1, 2, 4 or 8 channel measurement resources for channel measurement, composing virtual channels, and transmitting channel feedback to the eNB. The size of the codebook corresponding to the virtual channels may vary according to the sum of ranks selected for individual CSI-RS resources.

In an embodiment of the present invention, the UE performs channel estimation for each of one or more CSI-RS feedback configurations, selects an optimum precoding matrix from the codebook, and generates the RI and PMI. The UE selects an optimum precoding matrix from the codebook on the basis of the relationship between the CSI-RS feedback configurations, and generates and reports the RI and PMI. Thereafter, the eNB send a CSI-RS, which is a result of applying the fed back PMI to the additional CSI-RS configuration on the basis of the received RI and PMI, and the UE measures the corresponding CSI-RS channel and feeds back the CQI.

The UE identifies one or more feedback configurations based on CSI-RSs. The feedback configuration may be composed of the whole or a portion of RRC information as shown in Table 4 below.

TABLE 4

Feedback Configuration #1

Channel information: CSI-RS-1
Reporting (feedback) mode
PMI codebook information
Etc . . .
Feedback Configuration #2

Channel information: CSI-RS-2
Reporting (feedback) mode
PMI codebook information
Etc . . .
Feedback Configuration #N Channel information: CSI-RS-N
Reporting (feedback) mode
PMI codebook information
Etc . . .

The UE identifies one piece of feedback configuration information based on CSI-RS feedback configurations. The feedback configuration may be composed of the whole or a portion of RRC information as shown in Table 5 below.

TABLE 5

Feedback Configuration #N + 1

Channel information: CSI-RS feedback configuration #1, #2, . . . , #N
Reporting (feedback) mode
PMI codebook information
Etc . . .

An additional feedback configuration may be signaled to the UE as a resource for measurement of a beamformed CSI-RS channel as shown in Table 6 below.

TABLE 6

Feedback Configuration #N + 2

Channel information: CSI-RS-N + 1
Reporting (feedback) mode
PMI codebock information
Etc . . .

The UE receives Information on CSI-RS feedback configurations differing with each other with respect to the positive direction of the x-axis for individual columns forming 8 antenna groups among 64 total antennas structured as a 2D antenna array, and performs channel measurement for N CSI-RS resources. In this case, the channel matrix with a size of $N_{Rx} \times 8$ between the first CSI-RS feedback configuration and the UE may be represented as $H_1$, the channel matrix with a size of $N_{Rx} \times 8$ between the second CSI-RS feedback configuration and the UE may be represented as $H_2$, and the channel matrix with a size of $N_{Rx} \times 8$ between the $n^{th}$ CSI-RS feedback configuration and the UE may be represented as $H_x$.

A description is given of the selection of an optimum precoding matrix for the channel matrix measured at the CSI-RS feedback configuration. In this case, a scheme to select a precoding matrix maximizing the Signal-to-Noise Ratio (SNR) may be represented as Equation (16) below.

$$\hat{p}_n = \underset{p}{\operatorname{argmax}} \|H_n P\| \qquad (16)$$

In Equation (16) above, P refers to a set of 8×n precoding matrixes. P is a set of 8×n beamforming vectors and combines with the channel matrix $H_n$ so as to form beams of signals propagating toward desired directions. Here, n is the rank for the precoding matrix, and n=1 indicates a rank-1 precoding matrix and n=2 indicates a rank-2 precoding matrix. In Equation (16) above, precoding matrixes maximizing the SNR are different for different columns and the UE selects N total instances of $\hat{p}_n$. Consequently, for PMI feedback, the UE feeds back N instances of $\hat{p}_n$ for N feedback configurations. For the rank, the UE feeds back the rank after $\hat{p}_n$ is applied.

Thereafter, the UE composes virtual ports $$\begin{bmatrix} H_0 \hat{P}_0 \\ \cdots \\ H_n \hat{P}_n \end{bmatrix}$$

for N CSI-RS resources using $\hat{p}_n$ selected for 8 CSI-RS feedback configurations, and measures virtual channels for the N+1$^{th}$ CSI-RS feedback configuration. In this case, the virtual channels may be represented as a channel matrix with a size of $N_{Rx} \times v$ between virtual ports and the UE, and the number of virtual ports v may be represented as a sum of n for each CSI-RS resource determined at one CSI-RS feedback configuration.

The UE selects an optimum precoding matrix specifying the relationship between the CSI-RS feedback configurations by using Equation (17) below. In this case, selection of a precoding matrix maximizing the SNR may be represented as Equation (17) as follows.

$$\hat{p}' = \underset{p}{\operatorname{argmax}} \left\| \begin{bmatrix} H_0 \hat{P}_0 \\ \cdots \\ H_n \hat{P}_n \end{bmatrix} P \right\| \qquad (17)$$

In this case, P is a v×n' preceding matrix. P is a v×n' vector between port groups and is combined with the virtual channel matrix so that transmission is performed so as to maximize signal reception performance. In this case, n' is the rank for the precoding matrix, and n'=1 indicates a rank-1 precoding matrix and n'=2 Indicates a rank-2 precoding matrix. In Equation (17) above, the precoding matrix maximizing the SNR uses codebooks of different sizes according to the number of virtual ports v, and the optimum $\hat{p}'$ is selected accordingly.

Consequently, the UE feeds back one instance of $\hat{p}'$ for PMI feedback. For the rank, the UE feeds back the rank after $\hat{p}'$ is applied.

Thereafter, the UE measures channels for the N+1$^{th}$ CSI-RS resource and feeds back the CQI for corresponding channels. In this case, as the corresponding CSI-RS is a CSI-RS beamformed with the PMI fed back by the UE, only the CQI is fed back.

Figure 9:
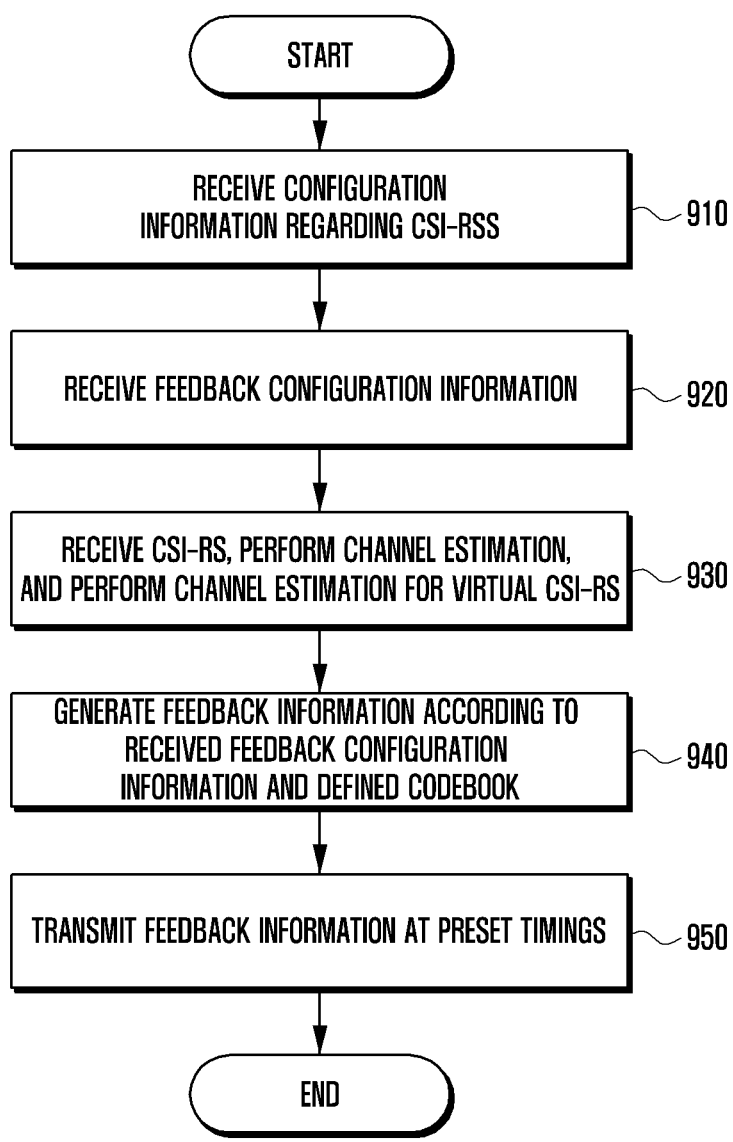
FIG. 9 is a flowchart depicting a sequence of operations performed by a UE according to an embodiment of the present invention.

FIG. 9 is a flowchart depicting a sequence of operations performed by the UE according to an embodiment of the present invention.

Referring to FIG. 9, in step 910, the UE receives configuration information regarding one or more CSI-RSs to perform channel estimation for each antenna port group. On the basis of the received configuration information, the UE may identify information regarding at least one of the number of ports associated with each CSI-RS, transmission timings and resource positions of CSI-RSs, sequences, and transmit power.

In step 920, the UE receives feedback configuration information based on one or more CSI-RSs.

The feedback configuration information includes information on the reporting mode or feedback mode indicating types of feedback information to be generated and reported by the UE. The feedback scheme may include estimating channels for N transmit antenna groups by using CSI-RS-1-N; generating PMI $i_1$ and PMI $i_2$ or CQI specifying optimum ranks and associated precoding matrixes for the estimated channels and reporting the same to the eNB; and generating PMI $i_1$ and $i_2$ and CQI specifying optimum rank and precoding matrix between CSI-RSs on the basis of the PMI selected between CSI-RSs and reporting the same to the eNB.

PMI codebook information is information on a set of precoding matrixes usable at the current channel condition in the codebook. When no PMI codebook information is contained in the RRC information for feedback, the UE may determine that all precoding matrixes defined in the codebook are usable for feedback.

In step 930, the UE receives CSI-RSs and estimates channels between N antenna groups of the eNB and $N_{Rx}$ receive antennas of the UE.

In step 940, the UE generates pieces of feedback information including rank, PMI $i_1$ and $i_2$, and CQI on the basis of the estimated channels, virtual channels between CSI-RSs, received feedback configuration, and defined codebook.

In step 950, the UE sends the pieces of feedback information to the eNB at feedback timings determined according to the feedback configuration from the eNB, thereby ending the procedure for generating and reporting channel feedback using a 2D antenna array.

Figure 10:
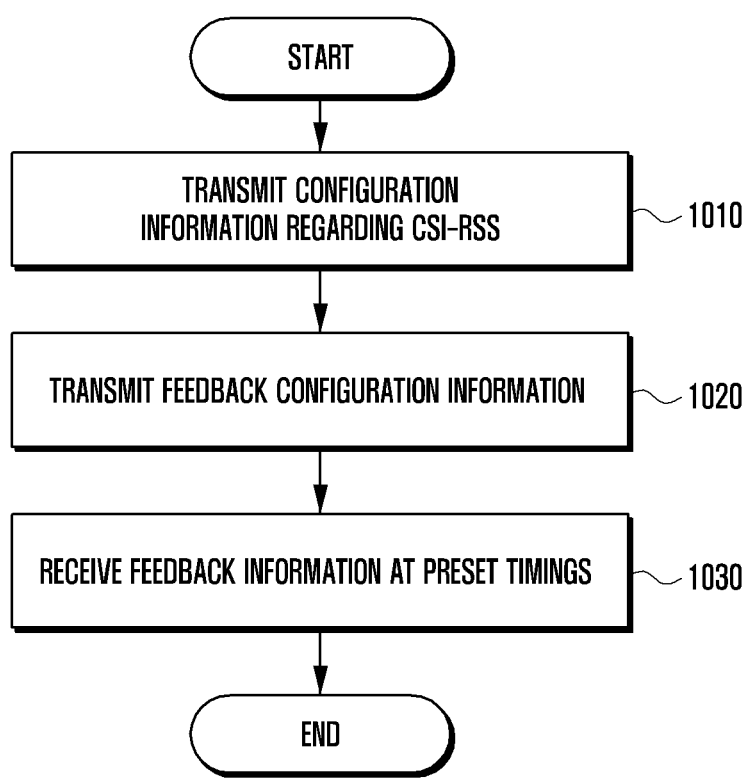
FIG. 10 is a flowchart depicting a sequence of operations performed by an eNB according to an embodiment of the present invention.

FIG. 10 is a flowchart depicting a sequence of operations performed by an eNB according to an embodiment of the present invention.

Referring to FIG. 10, in step 1010, the eNB sends configuration information regarding one or more CSI-RSs to the UE to perform channel estimation for each antenna port group. The configuration information may include information regarding at least one of the number of ports associated with each CSI-RS, transmission timings and resource positions of CSI-RSs, sequences, and transmit power.

In step 1020, the eNB sends feedback configuration information based on one or more CSI-RSs to the UE. In an embodiment of the present invention, the feedback configuration for two CSI-RSs may be composed of the whole or a portion of the RRC information as shown in Table 2 above.

Thereafter, the eNB sends configured CSI-RSs to the UE. The UE performs channel estimation for each antenna port and performs additional channel estimation for virtual resources on the basis of the estimation results for each antenna port. The UE determines one of the feedbacks described in various embodiments of the present invention, generates corresponding CQI, and sends the CQI to the eNB.

In step 1030, the eNB receives feedback information at preset timings and identifies states of the channels between the UE and eNB on the basis of the received feedback information.

Figure 11:
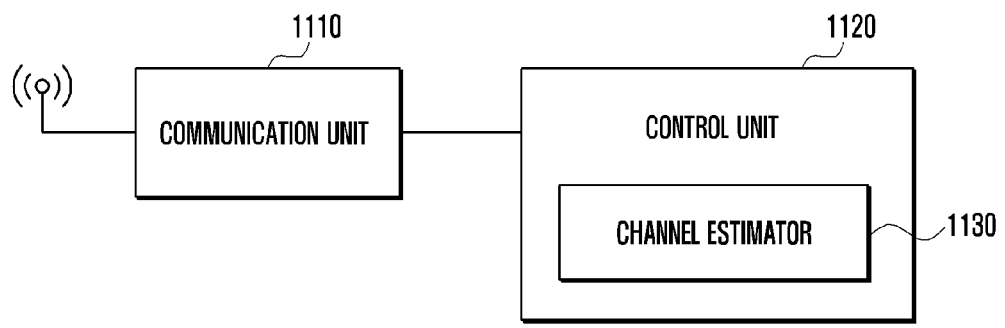
FIG. 11 is a block diagram of a UE according to an embodiment of the present invention.

FIG. 11 is a block diagram of a UE according to an embodiment of the present invention.

Referring to FIG. 11, the UE includes a communication unit 1110 and a control unit 1120.

The communication unit 1110 sends and receives data to and from an external entity such as an eNB. In particular, the communication unit 1110 sends feedback information to the eNB under the control of the control unit 1120.

The control unit 1120 controls states and operations of other components of the UE. In particular, the control unit 1120 generates feedback information according to configuration information received from the eNB. The control unit 1120 also controls the communication unit 1110 to feed channel state information back to the eNB according to timings set by the eNB. To this end, the control unit 1120 includes a channel estimator 1130.

The channel estimator 1130 identifies required feedback information according to CSI-RSs and feedback configuration Information received from the eNB, and performs channel estimation on the basis of the received CSI-RSs and the identified feedback Information.

In FIG. 11, the UE is described as including the communication unit 1110 and the control unit 1120. However, the UE may further include other various components according to the features or functions thereof. For example, the UE may further include a display unit to display current states, an input unit to receive an input signal for function execution from a user, and a storage unit to store data generated during operation. In the above description, the channel estimator 1130 is described as being included in the control unit 1120. However, the present invention is not limited thereto or thereby.

The control unit 1120 controls the communication unit 1110 to receive configuration information for each of one or more reference signal resources from the eNB. To measure at least one reference signal and generate corresponding feedback information, the control unit 1120 also controls the communication unit 1110 to receive feedback configuration information from the eNB.

The control unit 1120 measures at least one reference signal received through the communication unit 1110 and generates feedback information according to the feedback configuration information. The control unit 1120 controls the communication unit 1110 to send the generated feedback information to the eNB at feedback timings indicated by the feedback configuration information.

The control unit 1120 receives a CSI-RS, generates feedback information on the basis of the received CSI-RS, and reports the feedback information to the eNB. In this case, the control unit 1120 selects a precoding matrix for each antenna port group of the eNB and selects an additional precoding matrix on the basis of the relationship between the antenna port groups. The control unit 1120 creates a virtual channel on the basis of the precoding matrixes selected for the antenna port groups and sends the additional precoding matrix to the eNB via the virtual channel. The precoding matrixes and the additional precoding matrix include a first index indicating candidate beamforming vectors selectable for the current channel between the eNB and UE, and a second Index for selecting a beamforming vector to be used.

The control unit 1120 receives a CSI-RS, generates feedback information on the basis of the received CSI-RS, and reports the feedback information to the eNB. In this case, the control unit 1120 selects a precoding matrix for all antenna port groups of the eNB and selects an additional precoding matrix on the basis of the relationship between the antenna port groups. The control unit 1120 creates a virtual channel on the basis of the precoding matrix selected for the antenna port groups and sends the additional precoding matrix to the eNB via the virtual channel.

The control unit 1120 receives feedback configuration information from the eNB, receives CSI-RSs, generates feedback information on the basis of the received feedback configuration information and CSI-RSs, and sends the generated feedback information to the eNB. In this case, the control unit 1120 receives feedback configuration information corresponding to each antenna port group of the eNB and receives additional feedback configuration information based on the relationship between the antenna port groups.

The control unit 1120 sends first feedback information generated based on a first CSI-RS from the eNB, receives a second CSI-RS beamformed on the basis of the first feedback information from the eNB, generates second feedback information on the basis of the received second CSI-RS, and sends the second feedback information to the eNB.

Figure 12:
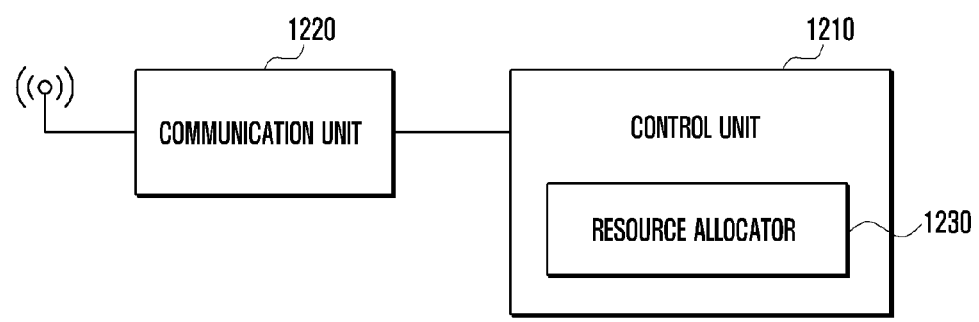
FIG. 12 is a block diagram of an eNB according to an embodiment of the present invention.

FIG. 12 is a block diagram of an eNB according to an embodiment of the present invention.

Referring to FIG. 12, the eNB includes a control unit 1210 and a communication unit 1220.

The control unit 1210 controls overall states and operations of components in the eNB. Specifically, to estimate horizontal and vertical domain channels of the UE, the control unit 1210 allocates CSI-RS resources to the UE and assigns feedback resources and timings to the UE. To this end, the control unit 1210 includes a resource allocator 1230.

To enable the UE to perform channel estimation for each antenna port group, the resource allocator 1230 assigns CSI-RSs to corresponding resources and sends the CSI-RSs through the resources. The resource allocator 1230 allocates feedback configurations and timings so that feedbacks from different UEs do not collide with each other, and receives and analyzes feedback information sent at preset timings.

The communication unit 1220 is configured to send and receive data, reference signals and feedback information to and from a UE. In this case, the communication unit 1220 sends CSI-RSs to the UE through resources allocated under the control of the control unit 1210 and receives feedback information on channel states from the UE.

In the above description, the resource allocator 1230 is depicted as being included in the control unit 1210. However, the present invention is not limited thereto or thereby.

The control unit 1210 controls the communication unit 1220 to send configuration information for one or more reference signals to the UE and generates the reference signals. The control unit 1210 also controls the communication unit 1220 to send feedback configuration information to the UE, so that the UE may generate feedback information corresponding to measurement results.

The control unit 1210 controls the communication unit 1220 to send one or more reference signals to the UE and receives feedback information from the UE at feedback timings set according to the feedback configuration information.

The control unit 1210 sends feedback configuration Information to the UE, sends CSI-RSs to the UE, and receives feedback information generated on the basis of the feedback configuration information and CSI-RSs from the UE. In this case, the control unit 1210 sends feedback configuration information corresponding to each antenna port group of the eNB and sends additional feedback configuration Information based on the relationship between the antenna port groups.

The control unit 1210 receives first feedback information from the UE, sends a CSI-RS beamformed based on the first feedback information to the UE, and receives second feedback Information generated based on the CSI-RS from the UE.

As described hereinabove, embodiments of the present Invention enable the base station having a large number of transmit antennas structured as a two dimensional array to avoid allocating excessive feedback resources for CSI-RS transmission without Increasing channel estimation complexity of a user equipment. The user equipment may measure channels associated with the large number of transmit antennas, compose feedback information based on measurement results, and report the feedback information to the base station in an effective manner.

In a feature of the present invention, the base station having a plurality of transmit antennas structured as a two dimensional array may avoid allocating excessive radio resources to measure channels associated with multiple antenna ports. The user equipment may measure channels associated with multiple antenna ports, compose feedback information based on measurement results, and report the feedback information to the base station in an effective manner.

While the present invention has been shown and described with reference to certain embodiments thereof, it will be understood by those skilled in the art that various modifications in form and details may be made therein without departing from the scope and spirit of the present invention as defined by the appended claims and their equivalents.

What is claimed is:

1. A method of a user equipment to send feedback information to a base station, the method comprising:
   receiving a channel status indication reference signal (CSI-RS) from a base station;
   selecting a precoding matrix for each antenna port group of the base station;
   determining an additional precoding matrix to maximize a signal-to-noise ratio (SNR) of a signal, transmitted using a first channel which is based on a second channel corresponding to the precoding matrixes selected respectively for the antenna port groups and the additional precoding matrix;
   generating feedback information comprising the selected precoding matrix and the additional precoding matrix, on a basis of the received CSI-RS; and
   transmitting the generated feedback information to the base station.

2. The method of claim 1, wherein transmitting the generated feedback information comprises transmitting the additional precoding matrix via the second channel.

3. A method of a user equipment to send feedback information to a base station, the method comprising:
   receiving a channel status indication reference signal (CSI-RS) from a base station;
   selecting a precoding matrix for all antenna port groups of the base station;
   determining an additional precoding matrix to maximize a signal-to-noise ratio (SNR) of a signal, transmitted using a first channel which is based on a second channel corresponding to the precoding matrixes for all of the antenna port groups and the additional precoding matrix;

generating feedback information comprising the selected precoding matrix and the additional precoding matrix, on a basis of the received CSI-RS; and transmitting the generated feedback information to the base station.

4. The method of claim 3, wherein transmitting the generated feedback information comprises transmitting the additional precoding matrix via the second channel.

5. The method of claim 1, wherein the precoding matrixes and the additional precoding matrix comprise a first index indicating candidate beamforming vectors selectable for a current channel between the base station and the user equipment, and a second index for selecting a beamforming vector to be used.

6. A method of a user equipment to send feedback information to a base station, the method comprising:
receiving feedback configuration information from the base station;
receiving a channel status indication reference signal (CSI-RS) from the base station;
selecting a precoding matrix for each antenna port group of the base station;
determining an additional precoding matrix to maximize a signal-to-noise ratio (SNR) of a signal, transmitted using a first channel which is based on a second channel corresponding to the precoding matrixes selected respectively for the antenna port groups and the additional precoding matrix;
generating feedback information comprising the selected precoding matrix and the additional precoding matrix, on a basis of the received feedback configuration information and the CSI-RS; and
transmitting the generated feedback information to the base station,
wherein receiving feedback configuration information comprises receiving feedback configuration information corresponding to antenna port groups of the base station and receiving additional feedback configuration information based on a relationship between the antenna port groups.

7. A method of a user equipment to send feedback information to a base station, the method comprising:
transmitting first feedback information generated based on a first channel status indication reference signal (CSI-RS) from the base station;
receiving a second CSI-RS beamformed on a basis of the first feedback information from the base station;
generating second feedback information on a basis of the received second CSI-RS, to maximize a signal-to-noise ratio (SNR) of a signal, transmitted using a first channel which is based on a second channel corresponding to the first feedback information and the second feedback information; and
transmitting the second feedback information to the base station.

8. A method of a base station to receive feedback information from a user equipment, the method comprising:
transmitting feedback configuration information to a user equipment (UE);
transmitting a channel status indication reference signal (CSI-RS) to the UE; and
receiving feedback information generated based on the feedback configuration information and the CSI-RS from the user equipment,
wherein the feedback information is generated, by the UE, to comprise a precoding matrix and an additional precoding matrix, the precoding matrix is selected for each antenna port group of the base station, and the additional precoding matrix is determined to maximize a signal-to-noise ratio (SNR) of a signal, transmitted using a first channel which is based on a second channel corresponding to the precoding matrixes selected respectively for the antenna port groups and the additional precoding matrix.

9. A method of a base station to receive feedback information from a user equipment (UE), the method comprising:
receiving first feedback information from the user equipment;
transmitting a channel status indication reference signal (CSI-RS) beamformed on the basis of the first feedback information to the user equipment; and
receiving second feedback information generated based on the CSI-RS from the UE,
wherein the second feedback information is generated, by the UE, to maximize a signal-to-noise ratio (SNR) of a signal, transmitted using a first channel which is based on a second channel corresponding to the first feedback information and the second feedback information.

10. A user equipment capable of sending feedback information to a base station, comprising:
a communicator configured to transmit and receive signals; and
a controller configured to control the communicator to receive a channel status indication reference signal (CSI-RS) from a base station, select a precoding matrix for each antenna port group of the base station, determine an additional precoding matrix to maximize a signal-to-noise ratio (SNR) of a signal, transmitted using a first channel which is based on a second channel corresponding to the precoding matrixes selected respectively for the antenna port groups and the additional precoding matrix, generate feedback information comprising the selected precoding matrix and the additional precoding matrix, on a basis of the received CSI-RS, and control the communicator to transmit the generated feedback information to the base station.

11. The user equipment of claim 10, wherein the controller is further configured to control the communicator to transmit the additional precoding matrix via the second channel.

12. A user equipment capable of sending feedback information to a base station, comprising:
a communicator configured to send and receive signals to and from the base station; and
a controller configured to control the communicator to receive a channel status indication reference signal (CSI-RS) from the base station, select a precoding matrix for all antenna port groups of the base station, determine an additional precoding matrix to maximize a signal-to-noise ratio (SNR) of a signal, transmitted using a first channel which is based on a second channel corresponding to the precoding matrixes for all of the antenna port groups and the additional precoding matrix, generate feedback information comprising the selected precoding matrix and the additional precoding matrix, on a basis of the received CSI-RS, and control the communicator to transmit the generated feedback information to the base station.

13. The user equipment of claim 12, wherein the controller further configured to control the communicator to transmit the additional precoding matrix via the second channel.

14. The user equipment of claim 10, wherein the precoding matrixes and the additional precoding matrix comprise a first index indicating candidate beamforming vectors selectable for a current channel between the base station and the user equipment, and a second index for selecting a beamforming vector to be used.

15. A user equipment capable of sending feedback information to a base station, comprising:
a communicator configured to send and receive signals to and from the base station; and
a controller configured to control the communicator to receive feedback configuration information from the base station, receive a channel status indication reference signal (CSI-RS) from the base station, select a precoding matrix for each antenna port group of the base station, determine an additional precoding matrix to maximize a signal-to-noise ratio (SNR) of a signal, transmitted using a first channel which is based on a second channel corresponding to the precoding matrixes selected respectively for the antenna port groups and the additional precoding matrix, generate feedback information comprising the selected precoding matrix and the additional precoding matrix, on a basis of the received feedback configuration information and CSI-RS, and control the communicator to transmit the generated feedback information to the base station.

16. A user equipment capable of sending feedback information to a base station, comprising:
a communicator configured to send and receive signals to and from the base station; and
a controller configured to control the communicator to transmit first feedback information generated based on a first CSI-RS from the base station, receive a second CSI-RS beamformed on a basis of the first feedback information from the base station, generate second feedback information on a basis of the received second CSI-RS, to maximize a signal-to-noise ratio (SNR) of a signal, transmitted using a first channel which is based on a second channel corresponding to the first feedback information and the second feedback information, and control the communicator to transmit the second feedback information to the base station.

17. A base station capable of receiving feedback information from a user equipment (UE), comprising:
a communicator configured to send and receive signals to and from the user equipment; and
a controller configure to control the communicator to transmit feedback configuration information to the user equipment, transmit a channel status indication reference signal (CSI-RS) to the user equipment, and receive feedback information generated based on the feedback configuration information and the CSI-RS from the user equipment,
wherein the feedback information is generated, by the UE, to comprise a precoding matrix and an additional precoding matrix, the precoding matrix is selected for each antenna port group of the base station, and the additional precoding matrix is determined to maximize a signal-to-noise ratio (SNR) of a signal, transmitted using a first channel which is based on a second channel corresponding to the precoding matrixes selected respectively for the antenna port groups and the additional precoding matrix.

18. A base station capable of receiving feedback information from a user equipment (UE), comprising:
a communicator configured to send and receive signals to and from the user equipment; and
a controller configure to control the communicator to receive first feedback information from the user equipment, transmit a channel status indication reference signal (CSI-RS) beamformed on a basis of the first feedback information to the user equipment, and receive second feedback information generated based on the CSI-RS from the user equipment,
wherein the second feedback information is generated, by the UE, to maximize a signal-to-noise ratio (SNR) of a signal, transmitted using a first channel which is based on a second channel corresponding to the first feedback information and the second feedback information.

* * * * *